US012697990B2

(12) United States Patent (10) Patent No.: US 12,697,990 B2
Okada et al. (45) Date of Patent: Aug. 4, 2026

(54) DRIVING ASSISTANCE DEVICE

(71) Applicants: SOKEN, INC., Nisshin-city (JP);
DENSO CORPORATION, Kariya-city
(JP)

(72) Inventors: Masaya Okada, Nisshin-city (JP);
Akihiro Hayashi, Kariya-city (JP);
Kunihiko Chiba, Kariya-city (JP)

(73) Assignees: DENSO CORPORATION, Kariya-city
(JP); SOKEN, INC., Nisshin-city (JP)

( * ) Notice: Subject to any disclaimer, the term of this
patent is extended or adjusted under 35
U.S.C. 154(b) by 42 days.

(21) Appl. No.: 18/825,893

(22) Filed: Sep. 5, 2024

(65) Prior Publication Data

US 2025/0083686 A1 Mar. 13, 2025

(30) Foreign Application Priority Data

Sep. 7, 2023 (JP) ................................. 2023-145663

(51) Int. Cl.
B60W 50/14 (2020.01)
B60W 30/095 (2012.01)
B60W 40/09 (2012.01)
*B60W 40/08* (2012.01)

(52) U.S. Cl.
CPC ........ B60W 50/14 (2013.01); B60W 30/0956
(2013.01); B60W 40/09 (2013.01); *B60W*
*2040/0818* (2013.01); *B60W 2050/143*
(2013.01); *B60W 2540/225* (2020.02); *B60W*
*2540/229* (2020.02); *B60W 2554/801*
(2020.02)

(58) Field of Classification Search
CPC .. B60W 50/14; B60W 30/0956; B60W 40/09;
B60W 2040/0818; B60W 2050/143;
B60W 2540/225; B60W 2540/229; B60W
2554/801
See application file for complete search history.

(56) References Cited

U.S. PATENT DOCUMENTS 10,994,742 B2 * 5/2021 Hayashi ............... G06V 40/172
11,161,499 B2 * 11/2021 Hashimoto ........... B60W 10/18
(Continued)

FOREIGN PATENT DOCUMENTS

JP 2003-317197 A 11/2003
JP 2005-135037 A 5/2005

*Primary Examiner* — Mohamed Barakat
(74) *Attorney, Agent, or Firm* — Precision Patents, P.C.

(57) ABSTRACT

A driving assistance device includes an object detection unit
configured to detect a hazardous object that is capable of
causing an accident in a path of a subject vehicle and
surroundings of the path, and an evasive driving detection
unit configured to detect features of driver's evasive driving,
in which a driver of the subject vehicle performs driving
operations to avoid danger of the accident when the subject
vehicle approaches and passes by the hazardous object
detected by the object detection unit. The driving assistance
device further includes a concentration level determination
unit configured to determine a concentration level of the
driver on driving based on the features of driver's evasive
driving detected by the evasive driving detection unit, and a
notification unit configured to, when the concentration level
determination unit determines that the concentration level of
the driver on driving is dropping, provide a notification to
encourage safe driving.

9 Claims, 24 Drawing Sheets

(56)                    References Cited

U.S. PATENT DOCUMENTS

| | | | | |
|---|---|---|---|---|
| 2005/0128063 A1* | 6/2005 | Isaji | .................... | B60W 10/18 |
| | | | | 340/576 |
| 2014/0139655 A1* | 5/2014 | Mimar | ............. | G08B 21/0476 |
| | | | | 340/575 |
| 2018/0370433 A1* | 12/2018 | Huang | .................. | H04N 5/272 |
| 2019/0300018 A1* | 10/2019 | Shibata | .................. | G01S 19/51 |
| 2020/0231182 A1* | 7/2020 | Oba | .................... | G05D 1/0061 |
| 2022/0169176 A1* | 6/2022 | Coudre | ............... | B60W 40/08 |
| 2023/0406204 A1* | 12/2023 | Moncomble | .......... | B60K 28/02 |

* cited by examiner

<DROP-IN -CONCENTRATION DETERMINATION>

<NOTIFICATION>

<LEARNING>

<DROP-IN-CONCENTRATION DETERMINATION & NOTIFICATION>

<LEARNING>

TTC

<DROP-IN-CONCENTRATION DETERMINATION & NOTIFICATION>

TTC

<LEARNING>

<DROP-IN-CONCENTRATION DETERMINATION & NOTIFICATION>

<DROP-IN –CONCENTRATION DETERMINATION>

<NOTIFICATION>

〈LEARNING〉

TTC

〈DROP-IN-CONCENTRATION DETERMINATION & NOTIFICATION〉

TTC

<NOTIFICATION>

TTC

<NOTIFICATION>

TTC

<LEARNING>

<DROP-IN-CONCENTRATION DETERMINATION & NOTIFICATION>

<NOTIFICATION>

<NOTIFICATION>

DRIVING ASSISTANCE DEVICE

CROSS-REFERENCE TO RELATED APPLICATION

This application is based on and claims the benefit of priority from earlier Japanese Patent Application No. 2023-145663 filed Sep. 7, 2023, the description of which is incorporated herein by reference.

BACKGROUND

Technical Field

The present disclosure relates to a driving assistance device for assisting a driver in driving.

Related Art

As an example of a driving assistance device, an alert system is known that detects a driver's consciousness level and alerts the driver according to a situation. This driving assistance device processes images of the driver's face captured by an on-board camera or the like, detects changes in eyelid opening/closing time during blinking or a direction in which the driver's line of sight is directed, and detects the driver's consciousness level based on an inattentive driving state.

DESCRIPTION OF SPECIFIC EMBODIMENTS

Figure 1:
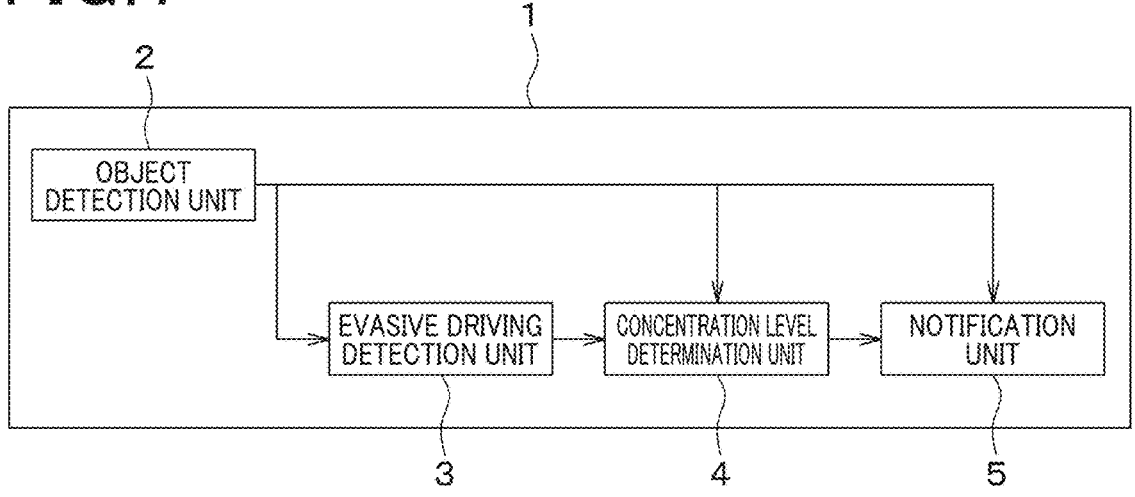
FIG. 1 is a schematic block diagram of a driving assistance device according to a first embodiment.

According to detailed research performed by the present inventors, the following issues have been found with the above known driving assistance device, as disclosed in JP 2003-317197 A.

(i) Image processing using an on-board camera mounted to a vehicle may not be able to stably detect an object to which the driver of the vehicle is directing his/her line of sight. In particular, the farther the driver looks, the more difficult it becomes to determine what exactly the driver is looking at.

(ii) Even when there is an object in a direction in which the driver's line of sight is directed that is capable of causing an accident (hereinafter referred to as a hazardous object), the driver may only be looking vaguely in that direction and may not recognize it as a hazardous object.

(iii) Even when the driver is aware of the hazardous object in the direction of his/her line of sight, the driver may have a dropped safety awareness to avoid the hazardous object, for example, due to impatience caused by some problem.

Due to the above issues (i), (ii), and (iii), the above known driving assistance devices may not be able to accurately detect the driver's consciousness level, i.e., a drop in concentration on driving, and may not be able to provide an effective notification to encourage safe driving.

In view of the foregoing, it is desired to have a driving assistance device capable of accurately determining a drop in driver's concentration on driving.

One aspect of the present disclosure provides a driving assistance device for a vehicle, including: an object detection unit configured to detect a hazardous object that is capable of causing an accident in a path of a subject vehicle and surroundings of the path, the subject vehicle being a vehicle to which the driving assistance device is applied; an evasive driving detection unit configured to detect features of driver's evasive driving, in which a driver of the subject vehicle performs driving operations to avoid a danger of the accident when the subject vehicle approaches and passes by the hazardous object detected by the object detection unit; a concentration level determination unit configured to determine a concentration level of the driver on driving based on the features of driver's evasive driving detected by the evasive driving detection unit; and a notification unit configured to, when the concentration level determination unit determines that the concentration level of the driver on driving is dropping, provide a notification to encourage safe driving.

According to the above configuration, the driving assistance device of the present disclosure determines the concentration level of the driver on driving based on the features of the driver's evasive driving to avoid an object that is capable of causing an accident (referred to as a hazardous object) by driver's driving operations. As compared to the technique for determining the driver's concentration level on driving based only on the driver's facial expression or line of sight, as in JP 2003-317197 A, the driving assistance device of the present disclosure can determine a drop in the driver's concentration level on driving with high accuracy. For example, the driving assistance device of the present disclosure is capable of determining a drop in the driver's concentration level on driving even when the hazardous object is reflected in the driver's eyes, but the driver only gawks at at it and does not recognize it as a hazardous object. For example, the driving assistance device of the present disclosure is also capable of determining a drop in the driver's concentration level on driving even when the driver is aware of the object as a hazardous object but is decreasing his/her safety awareness due to impatience or the like. Therefore, the driving assistance device of the present disclosure allows the driver to be convinced of the notification to encourage safe driving and decrease annoyance felt by the driver in response to the notification, thereby effectively encouraging the driver to drive safely.

Hereinafter, exemplary embodiments of the present disclosure will be described in detail with reference to the accompanying drawings, in which like reference numerals refer to similar elements and duplicated description thereof will be omitted.

First Embodiment

A first embodiment of the present disclosure will now be described. A driving assistance device according to the first embodiment is configured to provide a notification to encourage safe driving when the driver's level of concentration on driving is low. This driving assistance device is capable of reducing annoyance felt by the driver in response to the notification and effectively encouraging the driver to drive safely by accurately determining whether the driver's level of concentration on driving is dropping.

The driving assistance device is configured as an electronic control device comprising a microcomputer equipped with a processor, a memory such as a random-access memory (RAM), a read-only memory (ROM), and/or the like, and peripheral circuits. The driving assistance device is connected to on-board cameras (not shown), various types of sensors (not shown), and other electronic control devices (not shown) mounted to a vehicle, for example, via an in-vehicle LAN using CAN communications, or wiring harnesses, etc. CAN is the abbreviation for Controller Area Network, and LAN is the abbreviation for Local Area Network.

As illustrated in FIG. 1, the driving assistance device 1 functions as an object detection unit 2, an evasive driving detection unit 3, a concentration level determination unit 4, and a notification unit 5 to perform various control processes, by the processor executing one or more programs stored in the memory.

The object detection unit 2 detects objects that may cause accidents in the path of the vehicle to which the driving assistance device 1 is applied (hereinafter simply referred to as a subject vehicle) and surroundings of the path of the subject vehicle, by analyzing image data transmitted from the on-board cameras or by other means. The surroundings of the path of the subject vehicle include, for example, shoulders, roadside strips, sidewalks, and bicycle lanes. The hazardous objects include, for example, vehicles parked on the shoulders of the path of the subject vehicle or vehicles parked protruding from the shoulders of the path of the subject vehicle into the path, and pedestrians crossing the path of the subject vehicle or about to cross the path of the subject vehicle. The object detection unit 2 provides information on the detected hazardous objects to the evasive driving detection unit 3, the concentration level determination unit 4, the notification unit 5, and other units.

The evasive driving detection unit 3 detects features of evasive driving (hereinafter referred to as features of driver's evasive driving), in which the driver of the subject vehicle performs driving operations to avoid the risk of an accident when the subject vehicle approaches and passes by a hazardous object.

One of the features of driver's evasive driving is, for example, a distance between the subject vehicle and a hazardous object when the subject vehicle passes by the hazardous object (hereinafter referred to as a lateral distance Lm). In a case where the hazardous object is a vehicle parked on the shoulder (referred as a shoulder-parked vehicle), the lateral distance Lm may be a distance between the center of the subject vehicle and the subject-vehicle side outer wall of the shoulder-parked vehicle, or a distance between the parked-vehicle side outer wall of the subject vehicle and the subject-vehicle side outer wall of the shoulder-parked vehicle.

One of the features of driver evasive driving is, for example, a time to collision (TTC) when the driver initiates braking before a hazardous object. The time to collision is referred to as TTC in the following. TTC is a value acquired by dividing the distance between the current locations of the subject vehicle and the hazardous object by the current speed of the subject vehicle. The distance between the subject vehicle and the hazardous object is detected, for example, by millimeter wave radar or LiDAR. LiDAR is an abbreviation for Light Detection and Ranging or Laser Imaging Detection and Ranging. The speed of the subject vehicle is detected by a speed sensor.

The evasive driving detection unit 3 transmits the features of driver's evasive driving to the concentration level determination unit 4.

The concentration level determination unit 4 determines the driver's concentration level on driving based on the features of driver's evasive driving. In the first embodiment, the concentration level determination unit 4 determines that the driver's driving concentration level is low when the lateral distance Lm is less than a predefined distance threshold. The distance threshold is set beforehand by experiments or other means and pre-stored in the memory of the driving assistance device 1. The distance threshold may be set to a larger value as the speed of the subject vehicle increases, may be set as a function of the speed of the subject vehicle, or may be set to a different value depending on the presence or absence of a parallel traveling or oncoming vehicle in an adjacent lane.

The concentration level determination unit 4 determines that the driver's concentration level on driving is low when the TTC is less than a preset time threshold. The time threshold is set beforehand by experiments or other means and pre-stored in the memory of the driving assistance device 1. The time threshold may be set to a larger value as the speed of the subject vehicle increases, may be a function of the speed of the subject vehicle, or may be set to a different value depending on the presence or absence of a parallel traveling or oncoming vehicle in an adjacent lane.

The concentration level determination unit 4 transmits a result of determination of the driver's concentration level on driving to the notification unit 5.

When the concentration level determination unit 4 determines that the driver's concentration level on driving is low, the notification unit 5 provides a notification to encourage safe driving. For example, the notification unit 5 controls an in-vehicle speaker (not shown) to output an alert sound "pong" followed by outputting a voice message "Beware of pedestrians emerging from shoulder-parked vehicles." As an alternative, the notification unit 5 may control a head-up display (not shown) to indicate a text message "Beware of pedestrians emerging from shoulder-parked vehicles" along with a colored frame surrounding each shoulder-parked vehicle.

Figure 2:
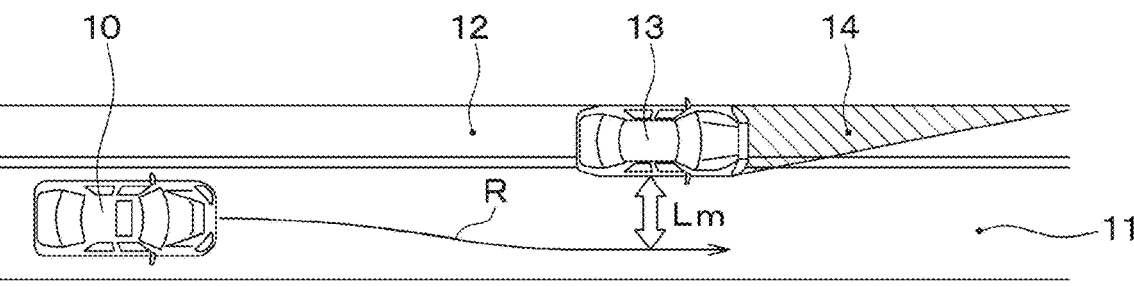
FIG. 2 is an illustration of making a drop-in-concentration determination when a subject vehicle approaches and passes by a shoulder-parked vehicle in the driving assistance device according to the first embodiment.
Figure 3:
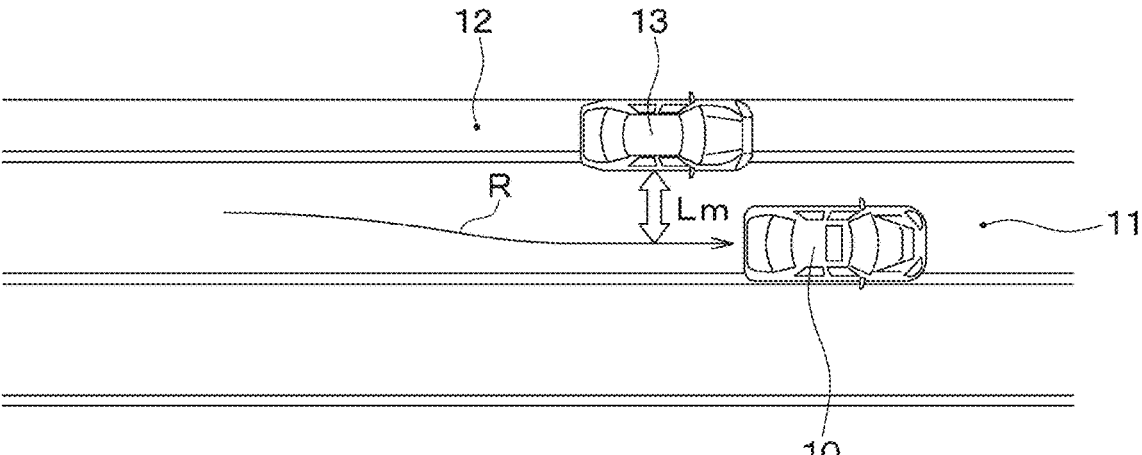
FIG. 3 is an illustration of providing a notification when the subject vehicle passes by the shoulder-parked vehicle, following the scene in FIG. 2.

FIGS. 2 and 3 illustrate a scenario where when the subject vehicle to which the driving assistance device 1 of the first embodiment is applied approaches and passes by a shoulder-parked vehicle, the driving assistance device 1 determines a drop in the driver's concentration level on driving based on the features of driver's evasive driving and then provides a notification.

As illustrated in FIG. 2, a shoulder-parked vehicle 13 is parked on the shoulder 12 ahead around the path 11 of the subject vehicle 10 (i.e., a lane of travel in which the subject vehicle is traveling). In this case, there is a possibility that a pedestrian (not shown) or the like may emerge from the blind spot area 14 of the shoulder-parked vehicle 13. Therefore, it is preferable for safe driving that the subject vehicle 10 reduces the speed of the subject vehicle, keeps the lateral distance Lm between the shoulder-parked vehicle 13 and the subject vehicle 10 as large as possible, and passes by the shoulder-parked vehicle 13.

However, the driver's concentration level on driving may reduce due to impatience, etc., and the driver may pass by the shoulder-parked vehicle 13 with a short lateral distance Lm between the shoulder-parked vehicle 13 and the subject vehicle 10 without decelerating, as indicated by the arrow R in FIG. 2. In the first embodiment, the concentration level determination unit 4 determines that the driver's concentration level on driving is low or is dropping when the lateral distance Lm as a feature of driver's evasive driving is less than the distance threshold.

In such a case, as illustrated in FIG. 3, after the subject vehicle 10 passes by the shoulder-parked vehicle 13, the notification unit 5 controls the in-vehicle speaker or the like to provide a notification to prompt the driver to drive safely. This allows the driving assistance device 1 to prompt the driver to restore his or her driving concentration level in later driving.

Conventional common automatic braking systems provide an alert or perform brake control to avoid colliding with a hazardous object when the driver's concentration level on driving is dropping and a collision with the hazardous object is imminent. In contrast, the driving assistance device 1 of the present embodiment detects in advance a trend of driver's dropping concentration level on driving and restores the driver's concentration level by notification so that a collision with a hazardous object does not become an imminent danger.

An example of the routine performed by the driving assistance device 1 of the first embodiment will now be described with reference to FIGS. 4 to 6, where the shoulder-parked vehicle 13 is a hazardous object and the lateral distance Lm is a feature of driver's evasive driving. This routine is performed repeatedly every predefined control cycle (e.g., every 100 ms).

In the following description and flowchart, the steps are denoted simply as "S".

Figure 4:
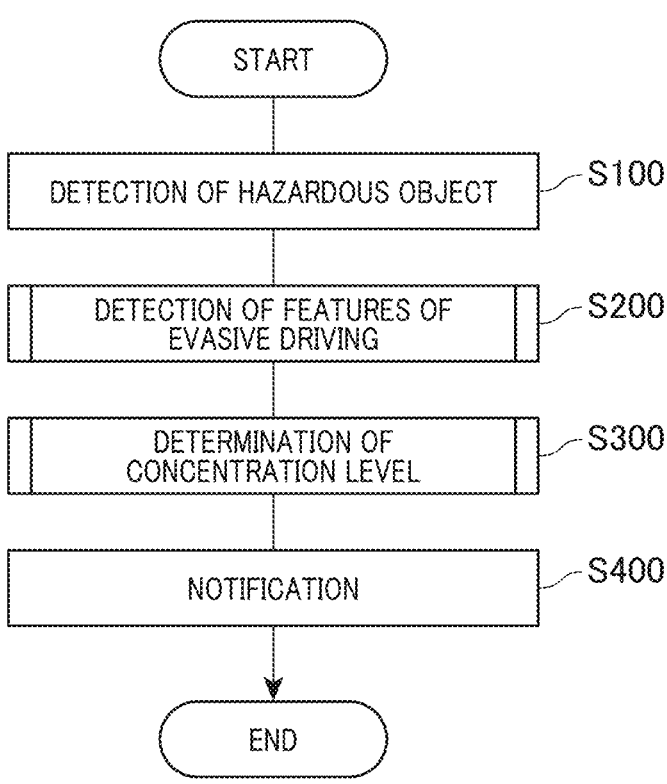
FIG. 4 is a flowchart of a routine performed by the driving assistance device according to the first embodiment.

At S100 in FIG. 4, the object detection unit 2 detects a hazardous object in the path of the subject vehicle 10 and surroundings of the path of the subject vehicle 10. The hazardous object is, for example, the shoulder-parked vehicle 13.

Next, at S200, the evasive driving detection unit 3 detects the feature of driver's evasive driving to avoid the hazardous object. The process at S200 will now be described in detail with reference to FIG. 5.

Figure 5:
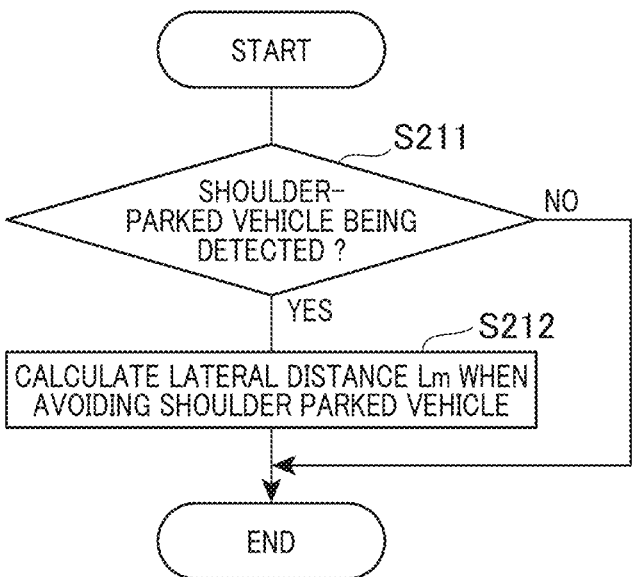
FIG. 5 is a flowchart illustrating a process at S200 in FIG. 4.

At S211 in FIG. 5, the evasive driving detection unit 3 determines whether the object detection unit 2 is detecting the shoulder-parked vehicle 13 as a hazardous object. If at S211 the evasive driving detection unit 3 determines that the object detection unit 2 is detecting the shoulder-parked vehicle 13, the process proceeds to S212. At S212, the evasive driving detection unit 3 calculates the lateral distance Lm when the subject vehicle 10 passes by the shoulder-parked vehicle 13, as a feature of driver's evasive driving, and then the process at S200 ends. Thereafter, the routine proceeds to S300. The evasive driving detection unit 3 stores in the memory the minimum value of the lateral distance Lm between the subject vehicle 10 and the shoulder-parked vehicle 13 detected before and after the subject vehicle 10 passes by the shoulder-parked vehicle 13.

If at S211 the evasive driving detection unit 3 determines that the object detection unit 2 is not detecting the shoulder-parked vehicle 13, then the process at S200 ends. Thereafter, the routine proceeds to S300.

Returning to FIG. 4, at S300, the concentration level determination unit 4 determines a drop in the driver's concentration level on driving. The process at S300 will now be described in detail with reference to FIG. 6.

Figure 6:
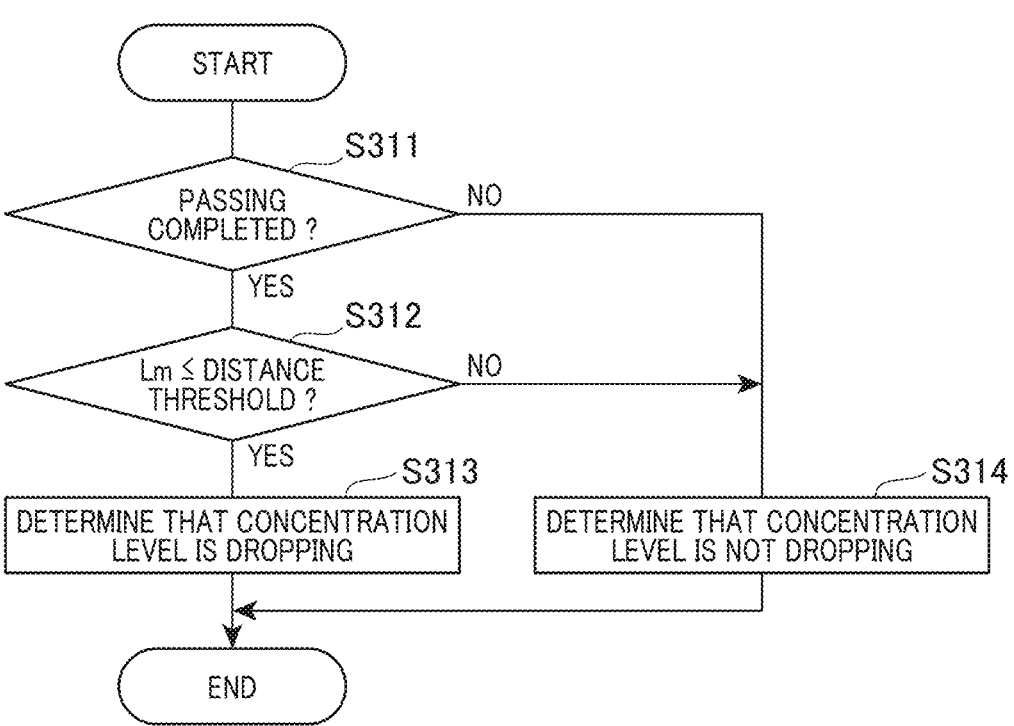
FIG. 6 is a flowchart illustrating a process at S300 in FIG. 4.

At S311 in FIG. 6, the concentration level determination unit 4 determines whether the subject vehicle 10 has completed passing by the shoulder-parked vehicle 13. If the concentration level determination unit 4 determines that the subject vehicle 10 has completed passing by the shoulder-parked vehicle 13, the process proceeds to S312.

At S312, the concentration level determination unit 4 determines whether the lateral distance Lm when the subject vehicle 10 passes by the shoulder-parked vehicle 13 is less than or equal to the distance threshold. If the concentration level determination unit 4 determines that the lateral distance Lm is less than or equal to the distance threshold, the process proceeds to S313.

At S313, the concentration level determination unit 4 determines that the driver's concentration level on driving is dropping, the process at S300 ends. Thereafter, the routine proceeds to S400.

If at S311 the concentration level determination unit 4 determines that the subject vehicle 10 has not completed passing by the shoulder-parked vehicle 13, i.e., the subject vehicle 10 is before passing (i.e., approaching) or is passing by the vehicle 13, the process proceeds to S314. If at S312 the concentration level determination unit 4 determines that the lateral distance Lm when the subject vehicle 10 passes by the shoulder-parked vehicle 13 is greater than the distance threshold, the process proceeds to S314.

At S314, the concentration level determination unit 4 determines that the driver's concentration level on driving is not dropping, the process at S300 ends. Thereafter, the routine proceeds to S400.

Returning again to FIG. 4, if the concentration level determination unit 4 determines that the driver's concentration level on driving is dropping, the notification unit 5 provides a notification to encourage safe driving. On the other hand, if the concentration level determination unit 4 determines that the driver's concentration level on driving is not dropping, the notification unit 5 does not provide any notification. After the process at S400, the process flow ends. The routine is performed repeatedly from S100 again in the subsequent control cycle.

The driving assistance device 1 of the first embodiment described above can provide the following advantages.

(1) In the first embodiment, the driving assistance device 1 includes the object detection unit 2, the evasive driving detection unit 3, the concentration level determination unit 4, and the notification unit 5, as functional blocks that perform various types of control processes. The object detection unit 2 detects hazardous objects in the path 11 of the subject vehicle 10 and the surroundings of the path 11. The evasive driving detection unit 3 detects features of driver's evasive driving to avoid hazardous objects. The concentration level determination unit 4 determines the driver's concentration level on driving based on the features of driver's evasive driving.

When the concentration level determination unit 4 determines that the driver's concentration level on driving is dropping, the notification unit 5 provides a notification to encourage safe driving.

This allows the driving assistance device 1 to determine the driver's concentration level on driving based on the features of driver's evasive driving. As compared to the method of determining the driver's concentration level on driving based only on the driver's facial expression or line of sight, as in JP 2003-317197 A, the driving assistance device 1 of the first embodiment can determine a drop in the driver's concentration level on driving with high accuracy. Therefore, the driving assistance device 1 can make the notification encouraging safe driving acceptable to the driver, reduce the annoyance that the driver feels about the notification, and effectively encourage the driver to drive safely.

(2) In the first embodiment, one of the features of driver's evasive driving is exemplified by the lateral distance Lm between the subject vehicle 10 and the hazardous object when the subject vehicle 10 passes by the hazardous object. This allows the driver's concentration level on driving to be determined with high accuracy.

(3) In the first embodiment, one of the features of driver's evasive driving is exemplified by the TTC when the driver initiates braking before a hazardous object. This also allows the driver's concentration level on driving to be determined with high accuracy.

Second Embodiment

A second embodiment will now be described with reference to the accompanying drawings, focusing on differences from the first embodiment. In the present embodiment, the configuration of the driving assistance device 1 and the routine are partially modified.

Figure 7:
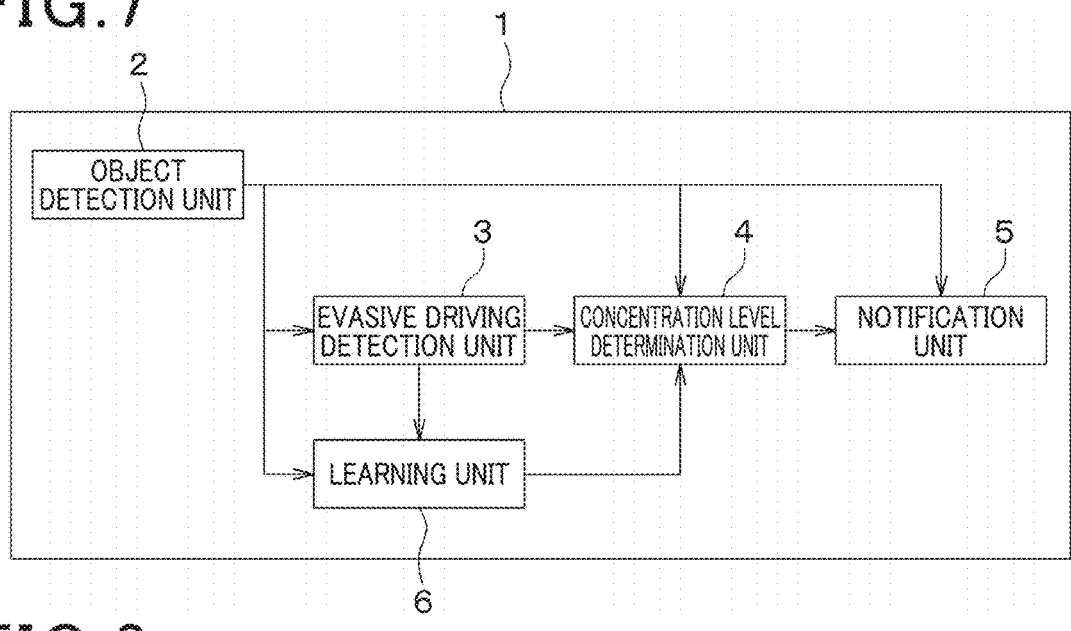
FIG. 7 is a schematic block diagram of a driving assistance device according to a second embodiment.

As illustrated in FIG. 7, the driving assistance device 1 of the second embodiment includes a learning unit 6, as well as the object detection unit 2, the evasive driving detection unit 3, the concentration level determination unit 4, and the notification unit 5, as functional blocks to perform various types of control processes. That is, the driving assistance device 1 of the second embodiment functions as the object detection unit 2, the evasive driving detection unit 3, the concentration level determination unit 4, the notification unit 5, and the learning unit 6, by the processor executing one or more programs stored in the memory.

The learning unit 6 receives information about hazardous objects from the object detection unit 2 and information about the features of driver's evasive driving from the evasive driving detection unit 3. Based on such information, the learning unit 6 learns the features of driver's evasive driving under normal conditions. The learned values acquired by the learning unit 6 are conveyed to the concentration level determination unit 4. When the learned values are valid, the concentration level determination unit 4 uses the learned values instead of the distance threshold or time threshold described in the first embodiment.

Figure 8:
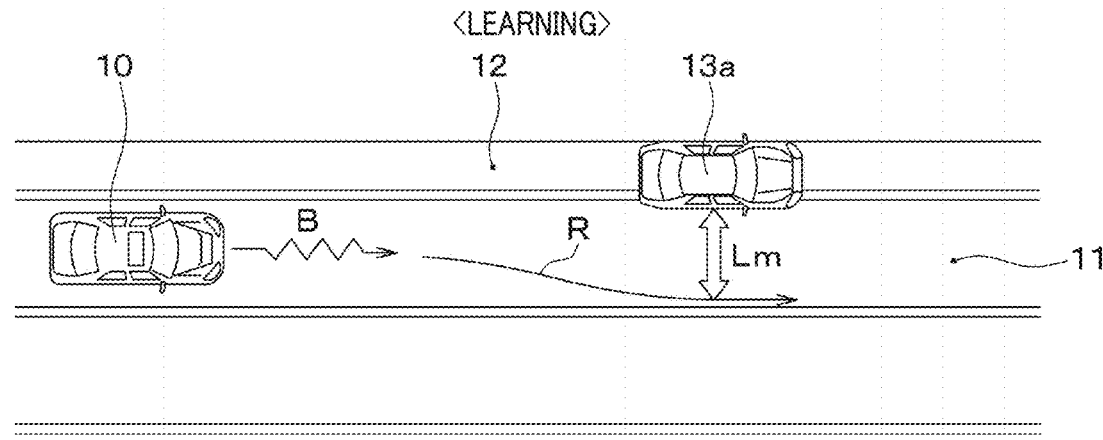
FIG. 8 is an illustration of learning features of driver's evasive driving when a subject vehicle approaches and passes by a shoulder-parked vehicle in the driving assistance device according to the second embodiment.
Figure 9:
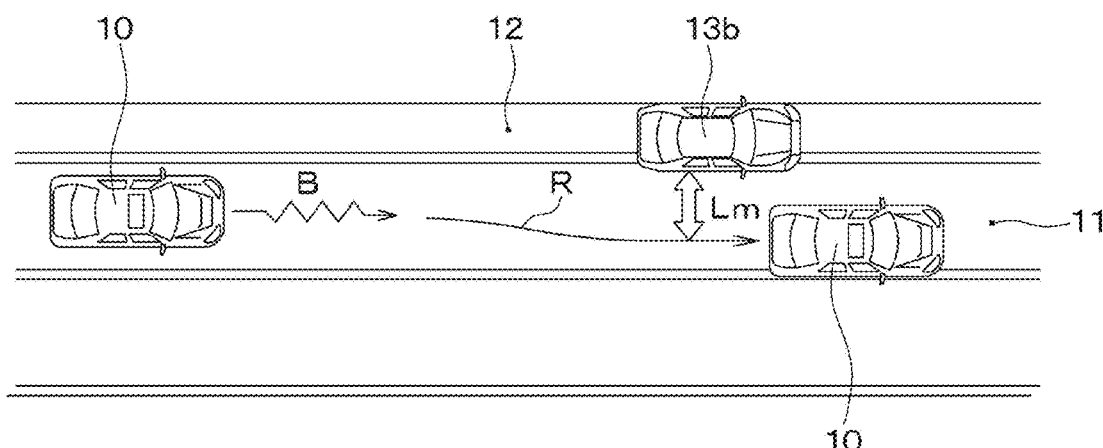
FIG. 9 is an illustration of making a drop-in-concentration determination and providing a notification when a subject vehicle approaches and passes by a shoulder-parked vehicle in a scene different from the scene in FIG. 8.

FIGS. 8 and 9 illustrate a scene where the driving assistance device 1 learns the features of driver's evasive driving when the subject vehicle 10 to which the driving assistance device 1 of the second embodiment is applied approaches and passes by the shoulder-parked vehicle 13, and then determines a drop in the driver's concentration level on driving and provides the notification. In each of FIGS. 8 and 9, the jagged arrow B schematically indicates that the subject vehicle 10 is decelerating, and the curved arrow R indicates the route of travel of the subject vehicle 10.

As illustrated in FIG. 8, a shoulder-parked vehicle 13 as a hazardous object is parked on the shoulder 12 ahead around the path 11 of the subject vehicle 10 (i.e., a lane of travel in which the subject vehicle is traveling). According to the driver's evasive driving under normal conditions, the subject vehicle 10 decelerates before the shoulder-parked vehicle 13a and passes by the shoulder-parked vehicle 13a with the lateral distance Lm between the shoulder-parked vehicle 13a and the subject vehicle 10 being as large as possible. In cases where the lateral distance Lm when the subject vehicle 10 passes by the shoulder-parked vehicle 13a is greater than or equal to the distance threshold described in the first embodiment, it can be said that the driver is performing evasive driving under normal conditions. In addition, in cases where the TTC when the subject vehicle 10 initiates braking before the shoulder-parked vehicle 13a is greater than or equal to the time threshold described in the first embodiment, it can be said that the driver is performing evasive driving under normal conditions.

The learning unit 6 stores the lateral distance Lm when the subject vehicle 10 passes by the shoulder-parked vehicle 13a as a characteristic of the driver's evasive driving under normal conditions, and calculates a lateral distance learned value Lm_1 based on one or more lateral distances Lm that have been stored.

As will be described in the third embodiment, etc., below, the learning unit 6 may store the TTC when the driver initiates braking before the shoulder-parked vehicle 13a as a characteristic of the driver's evasive driving under normal conditions, and calculate a TTC learned value TTCf_1 based on one or more TTCs that have been stored. In this case, the learning unit 6 stores the TTC when the driver initiates braking before the shoulder-parked vehicle 13a in a predefined folder TTCf set in the memory, and calculates the TTC learned value TTCf_1 based on the TTCf.

Next, FIG. 9 illustrates another scene following the scene illustrated in FIG. 8, with the subject vehicle 10 moving continuously from the scene in FIG. 8. As illustrated in FIG. 9, a different shoulder-parked vehicle 13b than the one illustrated in FIG. 8 is parked on the shoulder 12 ahead around the path 11 (i.e., a lane of travel in which the subject vehicle is traveling) in which the subject vehicle 10 is traveling. In this case, the driver's concentration level on driving may drop due to impatience or the like, and the driver may then overlook the shoulder-parked vehicle 13b, causing the subject vehicle to pass by the shoulder-parked vehicle 13b with a shorter lateral distance Lm between the shoulder-parked vehicle 13b and the subject vehicle 10, as indicated by the arrow R in FIG. 9. When the lateral distance Lm as a feature of driver's evasive driving is less than the lateral distance learned value Lm_1 acquired by learning in the scene shown in FIG. 8, etc., the concentration level determination unit 4 determines that the driver's concentration level on driving is dropping.

In such a case, after the subject vehicle 10 has passed by the shoulder-parked vehicle 13b, the notification unit 5 controls the in-vehicle speaker or the like to provide a notification to encourage safe driving. This allows the driving assistance device 1 to encourage the driver to restore his/her driving concentration in later driving.

An example of the routine performed by the driving assistance device 1 of the second embodiment will now be described with reference to FIGS. 10 to 13, where the shoulder-parked vehicle 13 is a hazardous object, the lateral distance Lm is a feature of driver's evasive driving, and the lateral distance learned value Lm_1 is a learned value acquired from learning by the learning unit 6. This routine is performed repeatedly every predefined control cycle (e.g., every 100 ms).

Figure 10:
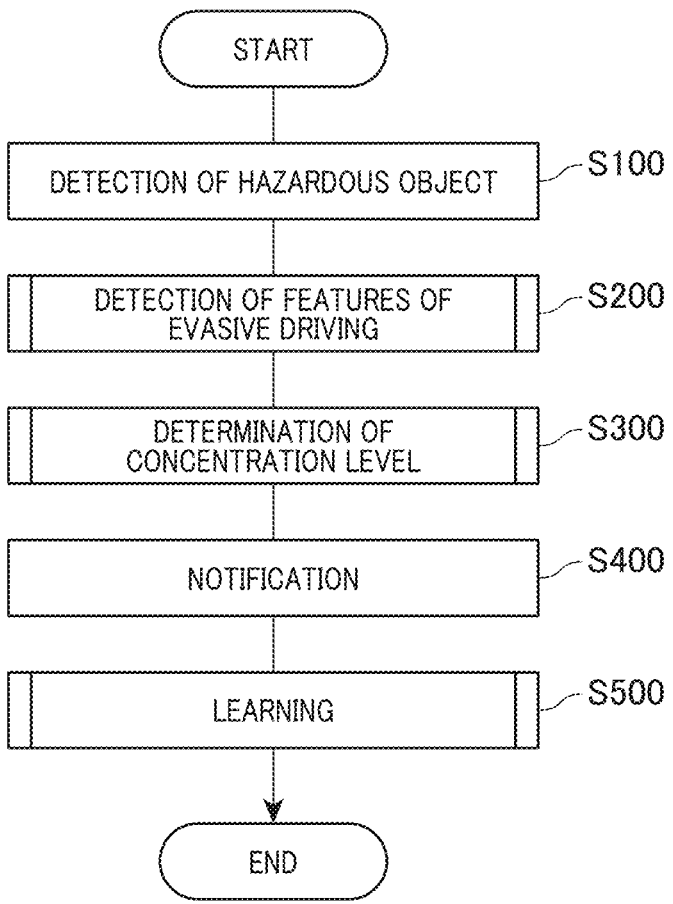
FIG. 10 is a flowchart of a routine performed by a driving assistance device according to a second embodiment.

At S100 in FIG. 10, the object detection unit 2 detects a hazardous object in the path of the subject vehicle 10 and surroundings of the path. The hazardous object is, for example, the shoulder-parked vehicle 13.

Next, at S200, the evasive driving detection unit 3 detects the feature of driver's evasive driving to avoid the hazardous object. The process at S200 will now be described in detail with reference to FIG. 11.

Figure 11:
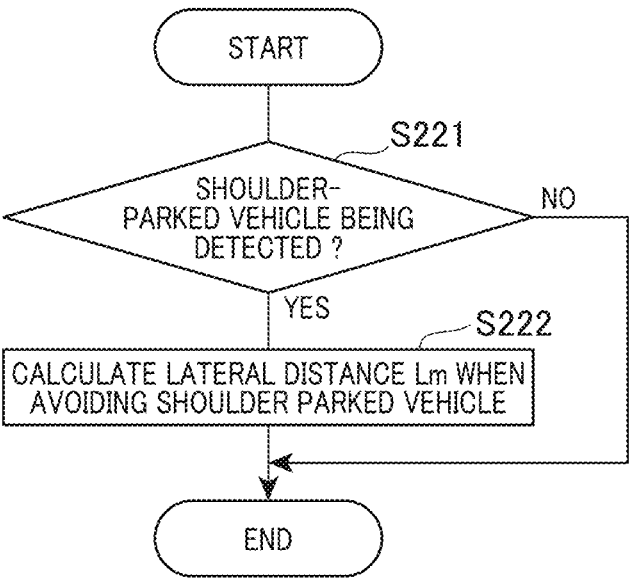
FIG. 11 is a flowchart illustrating a process at S200 in FIG. 10.

At S211 in FIG. 11, the evasive driving detection unit 3 determines whether the object detection unit 2 is detecting the shoulder-parked vehicle 13 as a hazardous object. If at S221 the evasive driving detection unit 3 determines that the object detection unit 2 is detecting the shoulder-parked vehicle 13, the process flow proceeds to S222. At S222, the evasive driving detection unit 3 calculates the lateral distance Lm when the subject vehicle 10 passes by the shoulder-parked vehicle 13, as a feature of driver's evasive driving, and then the process at S200 ends. Thereafter, the routine proceeds to S300. The evasive driving detection unit 3 stores in the memory the minimum value of the lateral distance Lm between the subject vehicle 10 and the shoulder-parked vehicle 13 detected before and after the subject vehicle 10 passes by the shoulder-parked vehicle 13.

If at S221 the evasive driving detection unit 3 determines that the object detection unit 2 is not detecting the shoulder-parked vehicle 13, then the process at S200 ends. Thereafter, the routine proceeds to S300.

Returning to FIG. 10, at S300, the concentration level determination unit 4 determines a drop in the driver's concentration level on driving. The process at S300 will now be described in detail with reference to FIG. 12.

Figure 12:
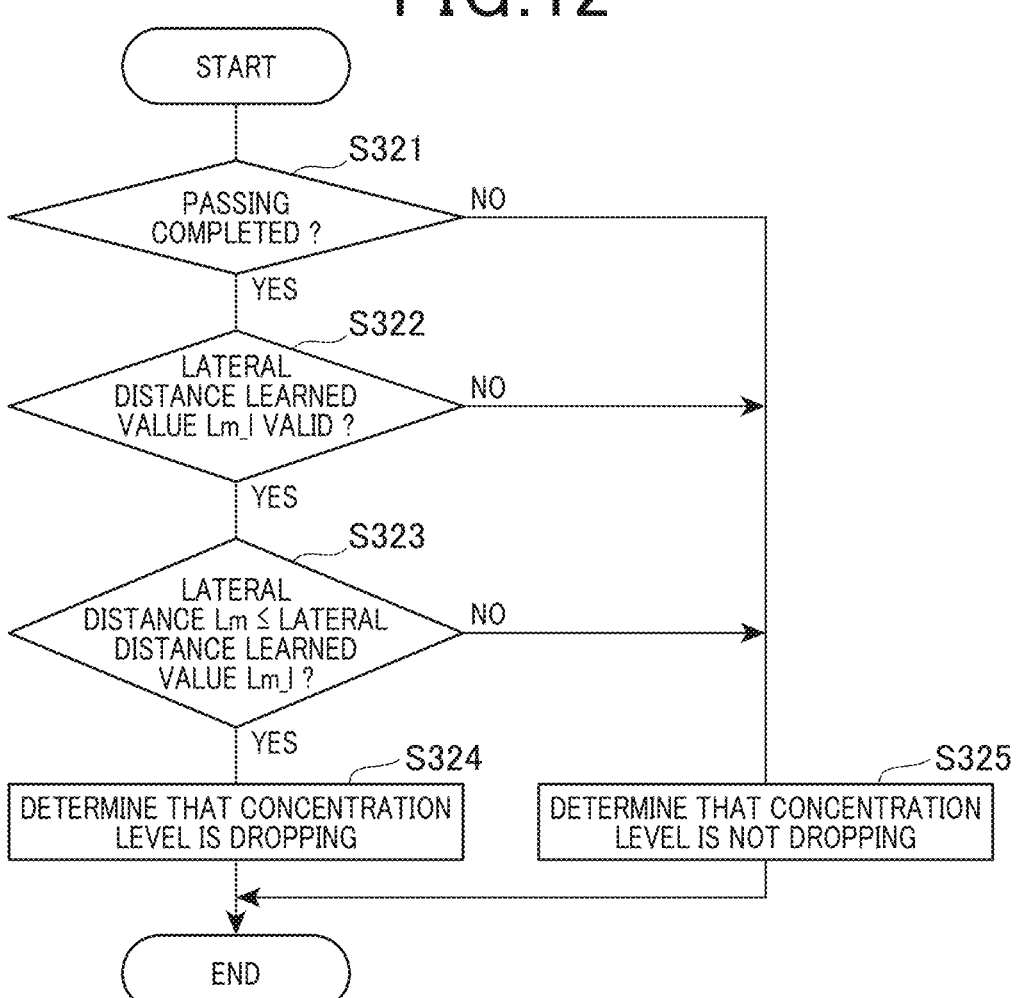
FIG. 12 is a flowchart illustrating a process at S300 in FIG. 10.

At S321 in FIG. 12, the concentration level determination unit 4 determines whether the subject vehicle 10 has completed passing by the shoulder-parked vehicle 13. If the concentration level determination unit 4 determines that the subject vehicle 10 has completed passing by the shoulder-parked vehicle 13, the process proceeds to S322.

At S322, the concentration level determination unit 4 determines whether the lateral distance learned value Lm_1 acquired from learning by the learning unit 6 is valid. This determination is made, for example, based on whether the lateral distance learned value Lm_1 has been updated a predefined number of times or more after a driving switch of the subject vehicle 10 is turned on. The number of times the lateral distance learned value Lm_1 is updated is reset when the driving switch of the subject vehicle 10 is turned off. The method of updating the lateral distance learned value Lm_1 will be described later. If the lateral distance learned value Lm_1 has been updated the predefined number of times or more after the driving switch of the subject vehicle 10 is turned on, the concentration level determination unit 4 determines that the lateral distance learned value Lm_1 is valid and the process then proceeds to S323.

At S323, the concentration level determination unit 4 determines whether the lateral distance Lm when the subject vehicle 10 passes by the shoulder-parked vehicle 13 is less than or equal to the lateral distance learned value Lm_1. If the concentration level determination unit 4 determines that the lateral distance Lm is less than or equal to the lateral distance learned value Lm_1, the process proceeds to S324.

At S324, the concentration level determination unit 4 determines that the driver's concentration level on driving is dropping, the process at S300 ends. Thereafter, the routine proceeds to S400.

On the other hand, if at S321 the concentration level determination unit 4 determines that the subject vehicle 10 has not completed passing by the shoulder-parked vehicle 13, i.e., the subject vehicle 10 is before passing (i.e., approaching) or is passing by the shoulder-parked vehicle 13, the process proceeds to S325. If at S322 the concentration level determination unit 4 determines that the lateral distance learned value Lm_1 acquired from learning by the learning unit 6 is not valid, the process also proceeds to S325. If at S323 the concentration level determination unit 4 determines that the lateral distance Lm when the subject vehicle 10 passes by the shoulder-parked vehicle 13 is greater than the lateral distance learned value Lm_1, the process proceeds to S325.

At S325, the concentration level determination unit 4 determines that the driver's concentration level on driving is not dropping, and the process at S300 ends. Thereafter, the routine proceeds to S400.

Returning again to FIG. 10, if the concentration level determination unit 4 determines that the driver's concentration level on driving is dropping, the notification unit 5 provides a notification to encourage safe driving at S400. Thereafter, the routine proceeds to S500. On the other hand, if the concentration level determination unit 4 determines that the driver's concentration level on driving is not dropping, the notification unit 5 does not provide any notification. Thereafter, the routine proceeds to S500.

At S500, the learning unit 6 learns the features of driver's evasive driving under normal conditions. The process at S500 will now be described in detail with reference to FIG. 13.

Figure 13:
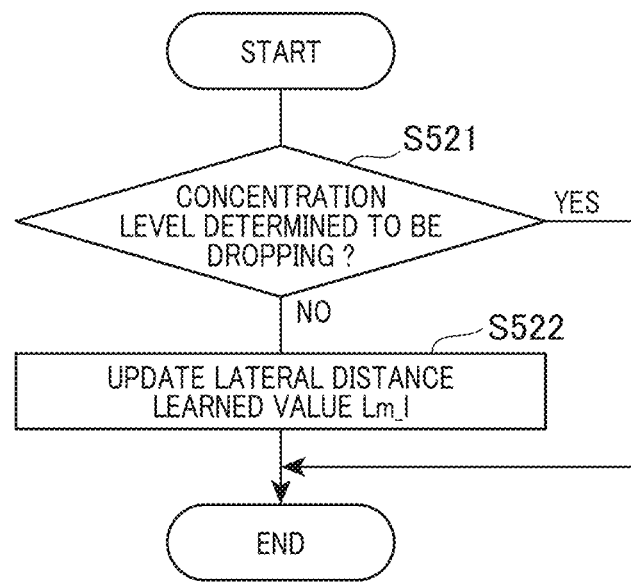
FIG. 13 is a flowchart illustrating a process at S500 in FIG. 10.

At S521 in FIG. 13, the learning unit 6 determines whether the driver's concentration level on driving has been determined to be dropping in the process at S300, at the timing when the subject vehicle 10 has completed passing by the shoulder-parked vehicle 13. If the learning unit 6 determines that the driver's concentration level on driving has not been determined to be dropping, the process proceeds to S522.

At S522, the learning unit 6 updates the lateral distance learned value Lm_1 using the lateral distances Lm when the subject vehicle 10 passes by the shoulder-parked vehicle 13. The case where the driver's concentration level on driving has not been determined to be dropping means driver's evasive driving under normal conditions. Therefore, if the driver's concentration level on driving has not been determined to be dropping, the lateral distance learned value Lm_1 is updated using the lateral distances Lm as the feature of driver's evasive driving under normal conditions. For example, the moving-average method may be used to update the lateral distance learned value Lm_1. In the moving-average method, the average of the lateral distances Lm in the past N scenes and the lateral distance Lm detected in the current scene are calculated.

On the other hand, if the determination unit 6 at S521 determines that the driver's concentration level on driving has been determined to be dropping in the process at S300, the process ends without updating the lateral distance learned value Lm_1. In that case, the lateral distance Lm_1 is not updated because the lateral distances Lm when the subject vehicle 10 passes by the shoulder-parked vehicle 13 are not a feature of driver's evasive driving under normal conditions.

After the process at S400, the routine in the current cycle ends. The routine is performed again from S100 in the subsequent control cycle.

The driving assistance device 1 of the second embodiment described above can provide the following advantages.

(1) In the second embodiment, the driving assistance device 1 includes the learning unit 6 in addition to the object detection unit 2, the evasive driving detection unit 3, the concentration level determination unit 4, and the notification unit 5 as functional blocks that perform various types of control processes. The learning unit 6 learns the features of driver's evasive driving under normal conditions. The concentration level determination unit 4 compares the features of driver's evasive driving learned by the learning unit 6 with the features of driver's evasive driving detected by the evasive driving detection unit 3 to determine whether the driver's concentration level on driving is dropping.

According to this configuration, the driver receives a notification encouraging safe driving when the features of driver's evasive driving under normal conditions and the features of driver's evasive driving in the current driving are different. Therefore, the driver is convinced of the notification and the annoyance is reduced. This allows the driving assistance device 1 to effectively encourage the driver to drive safely.

(2) In the second embodiment, when the features of driver's evasive driving do not meet a predefined criterion, the learning unit 6 does not reflect the features of evasive driving at that time in learning. On the other hand, when the features of driver's evasive driving meet the predefined criteria, the learning unit 6 reflects the features of evasive driving at that time in the learning.

This allows the learning unit 6 to learn the features of driver's evasive driving only when the features of driver's evasive driving meet the predefined criteria. Therefore, the features of driver's evasive driving that are learned by the learning unit 6 are modified to be on the safer side to set a predefined threshold. This allows the driving assistance device 1 to provide a notification with a high level of safety that corresponds to driving under normal conditions for each driver.

The predefined criteria may include, for example, the time threshold and distance threshold as described in the first embodiment. The case where the features of driver's evasive driving do not meet the predefined criteria means, for example, that the driver's concentration is determined to be dropping. On the other hand, the case where the features of driver's evasive driving meet the predefined criteria means, for example, that the driver's concentration is not determined to be dropping, i.e., the driver is in a normal condition.

Third Embodiment

A third embodiment will now be described with reference to the accompanying drawings, focusing on differences from the second embodiment. In the present embodiment, the driving assistance device 1 has the same configuration as in the second embodiment, but the routine is partially modified.

Figure 14:
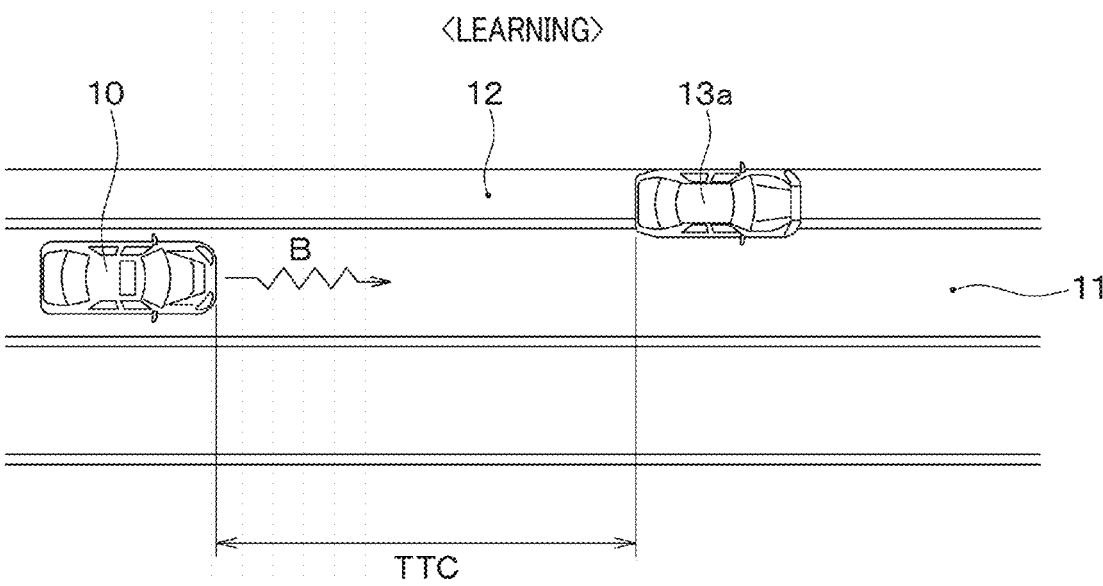
FIG. 14 is an illustration of learning features of driver's evasive driving when a subject vehicle approaches a shoulder-parked vehicle in a driving assistance device according to a third embodiment.
Figure 15:
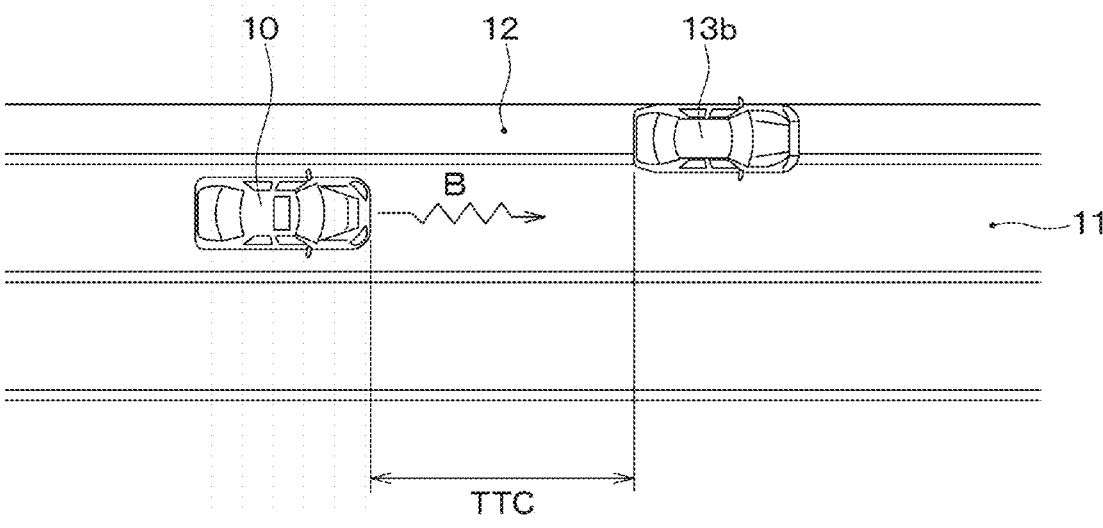
FIG. 15 is an illustration of making a drop-in-concentration determination and providing a notification when a subject vehicle approaches a shoulder-parked vehicle in a scene different from the scene in FIG. 14.

FIGS. 14 and 15 illustrate a scene where the driving assistance device 1 learns the features of driver's evasive driving when the subject vehicle 10 to which the driving assistance device 1 of the third embodiment is applied approaches and passes by the shoulder-parked vehicle 13, and then determines a drop in the driver's concentration level on driving and then provides the notification.

As illustrated in FIG. 14, a shoulder-parked vehicle 13 as a hazardous object is parked on the shoulder 12 ahead around the path 11 of the subject vehicle 10 (i.e., a lane of travel in which the subject vehicle is traveling). According to the driver's evasive driving under normal conditions, the subject vehicle 10 decelerates before the shoulder-parked vehicle 13a and passes by the shoulder-parked vehicle 13a with the lateral distance Lm between the shoulder-parked vehicle 13a and the subject vehicle 10 being as large as possible. In cases where the TTC when the subject vehicle 10 initiates braking before the shoulder-parked vehicle 13a is greater than or equal to the time threshold described in the first embodiment, it can be said that the driver is performing evasive driving under normal conditions. In addition, in cases where the lateral distance Lm when the subject vehicle 10 passes by the shoulder-parked vehicle 13a is greater than or equal to the distance threshold described in the first embodiment, it can be said that the driver is performing evasive driving under normal conditions.

In this case, the learning unit 6 stores the TTC when the driver initiates braking before the shoulder-parked vehicle 13a in TTCf as a feature of driver's evasive driving under normal conditions, and calculates the TTC learned value TTCf_1 based on that TTCf. As described in the second embodiment, the learning unit 6 may store the lateral distance Lm when the subject vehicle 10 passes by the shoulder-parked vehicle 13a as a feature of driver's evasive driving under normal conditions, and calculate the lateral distance learned value Lm_1.

Next, FIG. 15 illustrates another scene following the scene illustrated in FIG. 14, with the subject vehicle 10 moving continuously from the scene in FIG. 14. As illustrated in FIG. 15, a different shoulder-parked vehicle 13b than the one illustrated in FIG. 14 is parked on the shoulder 12 ahead around the path 11 (i.e., a lane of travel in which the subject vehicle is traveling) in which the subject vehicle 10 is traveling. In this case, the driver's concentration level on driving may drop due to impatience or the like, and the driver may then overlook the shoulder-parked vehicle 13b, leading to a decreased TTC. If the TTC as a feature of driver's evasive driving is less than the TTC learned value TTCf_1 acquired by learning in the scene illustrated in FIG. 14, the concentration level determination unit 4 determines that the driver's concentration level on driving is dropping.

In such a case, the notification unit 5 controls the in-vehicle speaker or the like and provides a notification to encourage safe driving. The notification may be provided before the subject vehicle 10 passes by the shoulder-parked vehicle 13b (i.e., when the vehicle is approaching the shoulder-parked vehicle 13b) or after the vehicle passes by the shoulder-parked vehicle 13b. This allows the driving assistance device 1 to encourage the driver to restore his/her driving concentration in later driving.

An example of the routine performed by the driving assistance device 1 of the third embodiment will now be described with reference to FIGS. 16 to 19, where the shoulder-parked vehicle 13 is a hazardous object, the TTC is a feature of driver's evasive driving, and the TTC learned value TTCf_1 is a learned value acquired from learning by the learning unit 6. This routine is performed repeatedly every predefined control cycle (e.g., every 100 ms).

Figure 16:
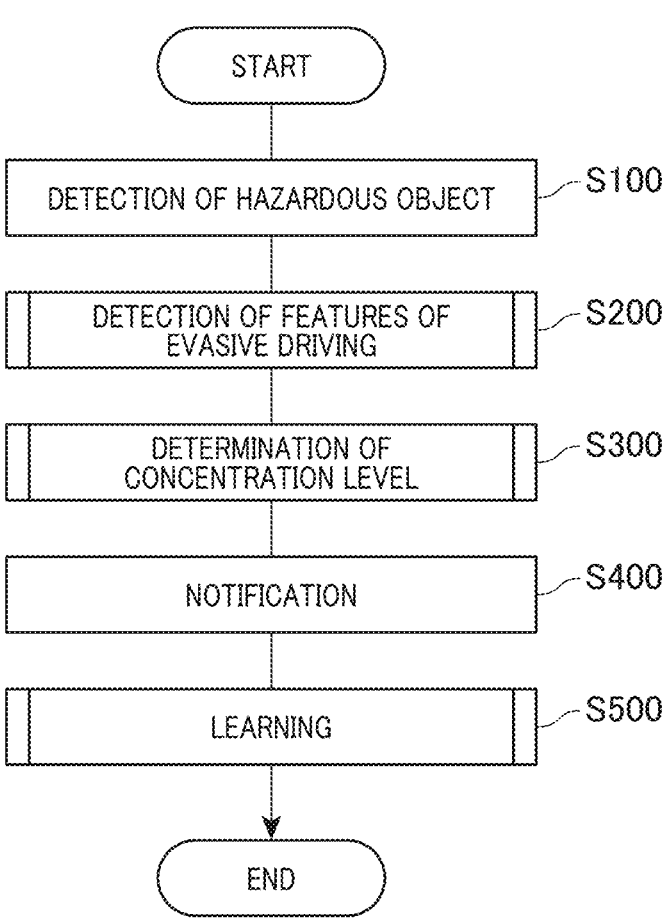
FIG. 16 is a flowchart of a routine performed by a driving assistance device according to a third embodiment.

At S100 in FIG. 16, the object detection unit 2 detects a hazardous object in the path of the subject vehicle 10 and surroundings of the path. The hazardous object is, for example, the shoulder-parked vehicle 13.

Next, at S200, the evasive driving detection unit 3 detects the feature of driver's evasive driving to avoid the hazardous object. The process at S200 will now be described in detail with reference to FIG. 17.

Figure 17:
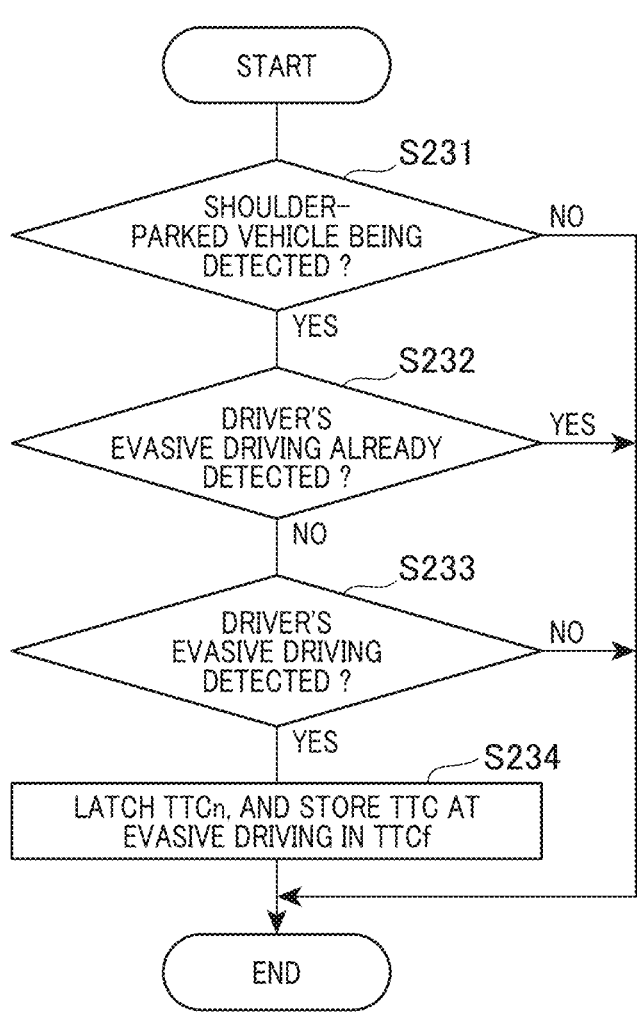
FIG. 17 is a flowchart illustrating a process at S200 in FIG. 16.
Figure 18:
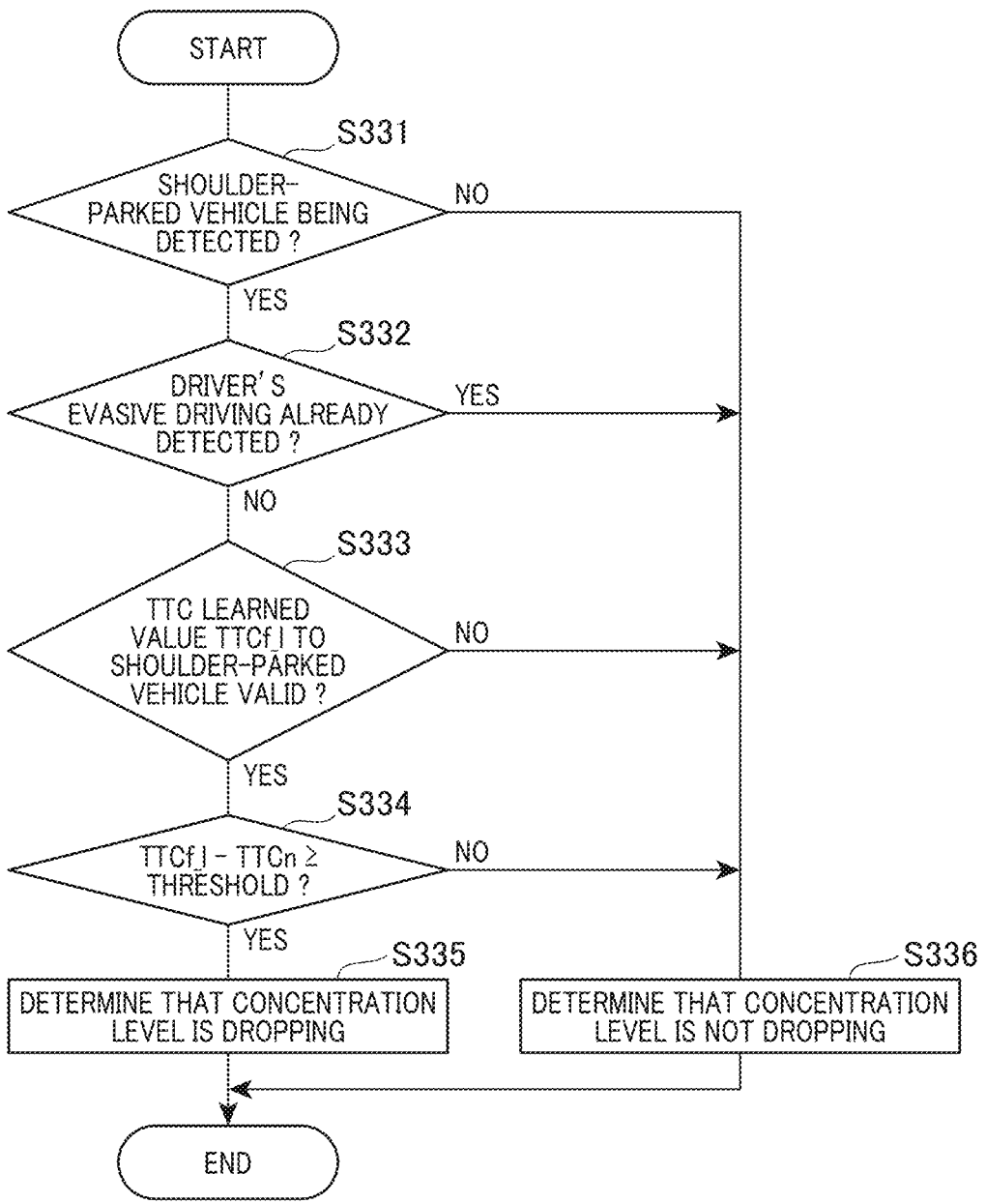
FIG. 18 is a flowchart illustrating a process at S300 in FIG. 16.

At S231 in FIG. 17, the evasive driving detection unit 3 determines whether the object detection unit 2 is detecting the shoulder-parked vehicle 13 as a hazardous object. If at S231 the evasive driving detection unit 3 determines that the object detection unit 2 is detecting the shoulder-parked vehicle 13, the process proceeds to S232.

At S232, the evasive driving detection unit 3 determines whether the driver's evasive driving has already been detected. If at S232 the evasive driving detection unit 3 determines that the driver's evasive driving has not been detected, the process proceeds to S233.

At S233, the evasive driving detection unit 3 determines whether the driver's evasive driving has been detected. If at S233 the evasive driving detection unit 3 determines that the driver's evasive driving has been detected, the process proceeds to S234.

At S234, the evasive driving detection unit 3 stores (latches), as a feature of driver's evasive driving, TTCn when the driver initiates braking before the shoulder-parked vehicle 13 in the TTCf as the TTC at evasive driving to avoid the shoulder-parked vehicle 13, and then the routine proceeds to S300.

If at S231 the evasive driving detection unit 3 determines that the object detection unit 2 is not detecting the shoulder-parked vehicle 13, then the process at S200 ends. Thereafter, the routine proceeds to S300. On the other hand, if at S232 the evasive driving detection unit 3 determines that the driver's evasive driving has already been detected, the process at S200 ends. Thereafter, the routine proceeds to S300. If at S233 the evasive driving detection unit 3 determines that the driver's evasive driving has not been detected, the process at S200 ends. Thereafter, the routine proceeds to S300.

Returning to FIG. 16, at S300, the concentration level determination unit 4 determines a drop in the driver's concentration level on driving. The process at S300 will now be described in detail with reference to FIG. 18.

At S211 in FIG. 5, the concentration level determination unit 4 determines whether the object detection unit 2 is detecting the shoulder-parked vehicle 13 as a hazardous object. If at S331 the concentration level determination unit 4 determines that the object detection unit 2 is detecting the shoulder-parked vehicle 13, the process proceeds to S332.

At S332, the concentration level determination unit 4 determines whether the evasive driving detection unit 3 has already detected the driver's evasive driving. If the concentration level determination unit 4 determines at S332 that the evasive driving detection unit 3 has not detected the driver's evasive driving, the process proceeds to S333.

At S333, the concentration level determination unit 4 determines whether the TTC learned value TTCf_1 acquired from learning by the learning unit 6 is valid. This determination is made, for example, based on whether the TTC learned value TTCf_1 has been updated a predefined number of times or more after the driving switch of the subject vehicle 10 is turned on. The number of times the TTC learned value TTCf_1 is updated is reset when the driving switch of the subject vehicle 10 is turned off. The method of updating the TTC learned value TTCf_1 will be described later. If the TTC learned value TTCf_1 has been updated the predefined number of times or more after the driving switch of the subject vehicle 10 is turned on, the concentration level determination unit 4 determines that the TTC learned value TTCf_1 is valid and the process then proceeds to S334.

At S334, the concentration level determination unit 4 determines whether the value acquired by subtracting the real-time TTCn to the shoulder-parked vehicle 13 from the TTC learned value TTCf_1 (i.e., TTCf_1-TTCn) is greater than or equal to a predefined threshold. The value of TTCn is acquired by dividing the distance from the subject vehicle to the hazardous object by the speed of the subject vehicle, regardless of whether the driver has initiated braking. Therefore, even before the driver initiates braking, the above subtraction process is performed in real time to determine the concentration level. If at S334, the concentration level determination unit 4 determines that TTCf_1-TTCn is greater than or equal to the predefined threshold, the process proceeds to S335. The predefined threshold is zero or a positive number.

At S335, the concentration level determination unit 4 determines that the driver's concentration level on driving is dropping, the process at S300 ends. Thereafter, the routine proceeds to S400.

If at S331 the concentration level determination unit 4 determines that the object detection unit 2 is not detecting the shoulder-parked vehicle 13, then the process proceeds to S336. If at S332 the concentration level determination unit 4 determines that the evasive driving detection unit 3 has already detected the driver's evasive driving, the process also proceeds to S336. If at S333 the concentration level determination unit 4 determines that the TTC learned value TTCf_1 acquired from learning by the learning unit 6 is not valid, the process also proceeds to S336. If at S333 the concentration level determination unit 4 determines that TTCf_1-TTCn is less than a predefined threshold, the process also proceeds to S336.

At S336, the concentration level determination unit 4 determines that the driver's concentration level on driving is not dropping, the process at S300 ends. Thereafter, the routine proceeds to S400.

Returning again to FIG. 16, if the concentration level determination unit 4 determines that the driver's concentration level on driving is dropping, the notification unit 5 provides a notification to encourage safe driving at S400. Thereafter, the routine proceeds to S500. On the other hand, if the concentration level determination unit 4 determines that the driver's concentration level on driving is not dropping, the notification unit 5 does not provide any notification. Thereafter, the routine proceeds to S500.

At S500, the learning unit 6 learns the features of driver's evasive driving under normal conditions. The process at S500 will now be described in detail with reference to FIG. 19.

Figure 19:
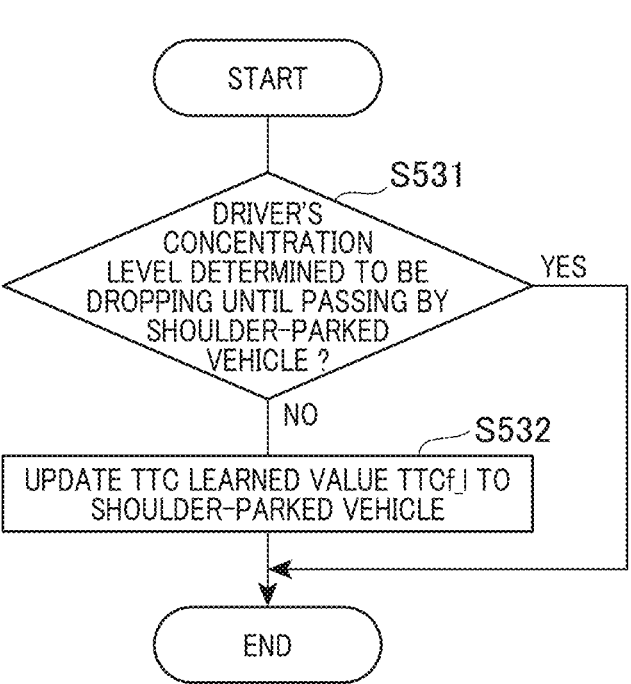
FIG. 19 is a flowchart illustrating a process at S500 in FIG. 16.

At S531 in FIG. 19, the learning unit 6 determines at the timing when the subject vehicle 10 has completed passing by the shoulder-parked vehicle 13, whether the driver's concentration level on driving has been determined to be dropping in the process at S300 until the subject vehicle 10 passes by the shoulder-parked vehicle 13. If at S531 the learning unit 6 determines that the driver's concentration level on driving has not been determined to be dropping until the subject vehicle 10 passes by the shoulder-parked vehicle 13, then the process proceeds to S532.

At S532, the learning unit 6 updates the TTC learned value TTCf_1 with respect to the shoulder-parked vehicle 13 using the TTCn when the subject vehicle 10 initiates braking before the shoulder-parked vehicle 13. The case where the driver's concentration level on driving is not determined to be dropping means that the driver's concentration level on driving is normal. Therefore, if the driver's concentration level on driving has not been determined to be dropping, the TTC learned value TTCf_1 with respect to the shoulder-parked vehicle is updated using TTCf, which is a feature of driver's evasive driving under normal conditions. For example, a moving-average method is used to update the TTC learned value TTCf_1. In the moving-average method, the average of the TTCs in the past N scenes and the TTCn detected in the current scene is calculated.

On the other hand, if at S531 the learning unit 6 determines at the timing when the subject vehicle 10 has completed passing by the shoulder-parked vehicle 13, that the driver's concentration level on driving has been determined to be dropping in the process at S300 until the subject vehicle 10 passes by the shoulder-parked vehicle 13, the process ends without updating the TTC learned value TTCf_1. In that case, the TTC learned value TTCf_1 is not updated because it is not a feature of driver's evasive driving under normal conditions.

After the process at S500, the routine in the current cycle ends. The routine is performed again from S100 in the subsequent control cycle.

The driving assistance device 1 of the third embodiment described above can provide the same advantages as in the second embodiment.

Fourth Embodiment

A fourth embodiment will now be described with reference to the accompanying drawings, focusing on differences from the second embodiment. In the present embodiment, the driving assistance device 1 has the same configuration as in the second embodiment, but the routine is partially modified.

Figure 20:
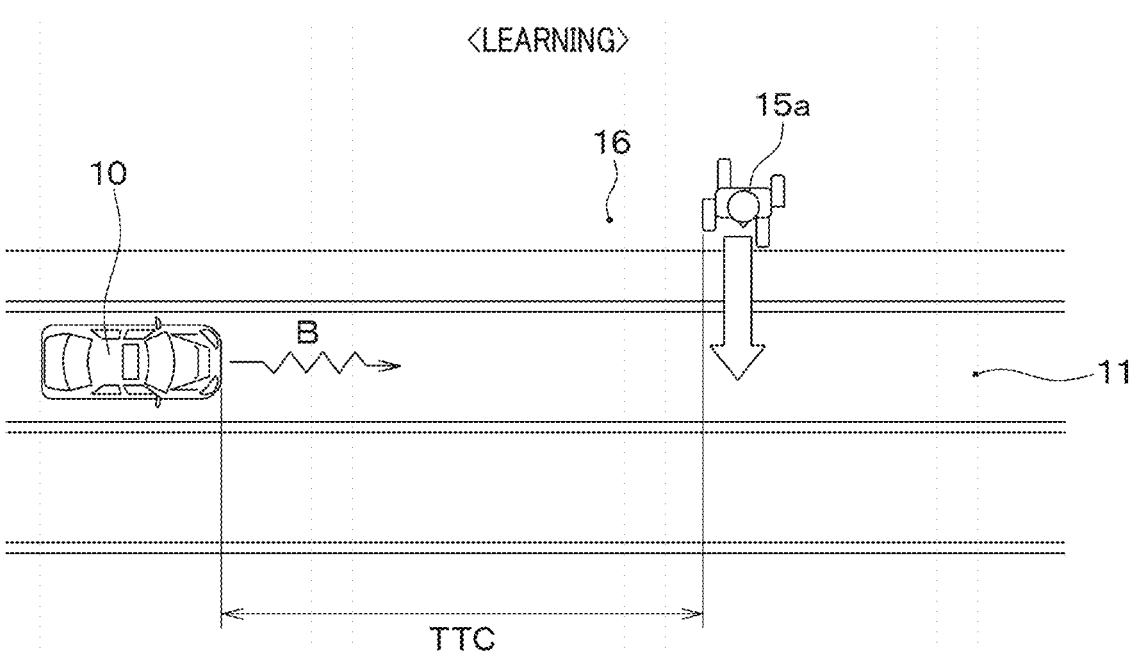
FIG. 20 is an illustration of learning features of driver's evasive driving when there is a pedestrian around a path of a subject vehicle, who is about to cross the path, in a driving assistance device according to a fourth embodiment.
Figure 21:
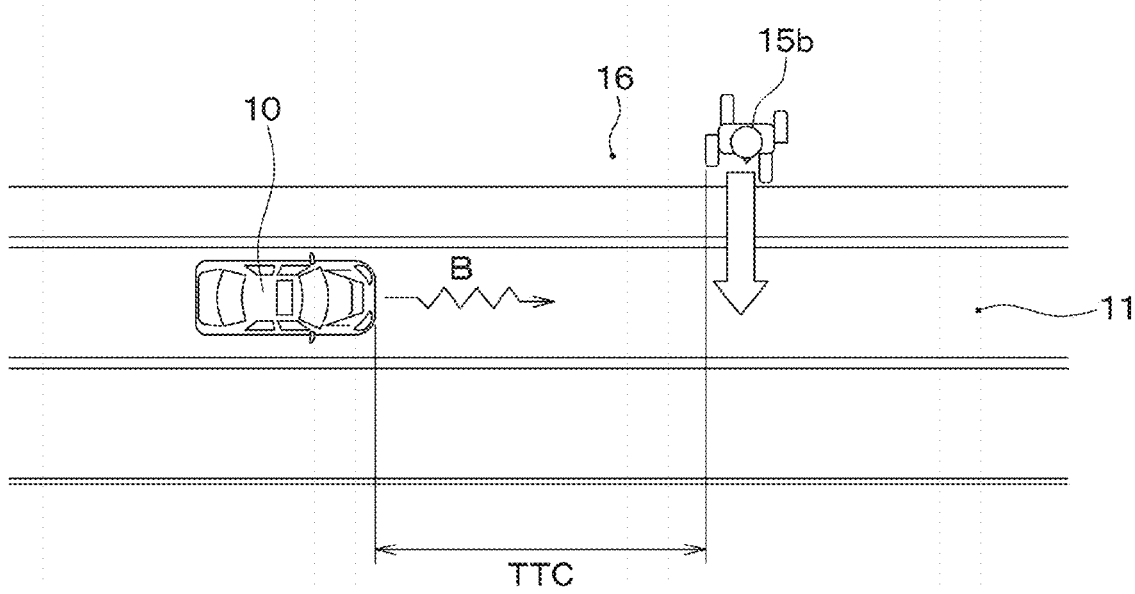
FIG. 21 is an illustration of making a drop-in-concentration determination and providing a notification when there is a pedestrian around a path of a subject vehicle, who is about to cross the path, in a scene different from the scene in FIG. 20.

FIGS. 20 and 21 illustrate a scene where the driving assistance device 1 learns the features of driver's evasive driving when the subject vehicle 10 to which the driving assistance device 1 of the fourth embodiment is applied approaches and passes by a pedestrian, and then determines a drop in the driver's concentration level on driving and then provides the notification.

As illustrated in FIG. 20, there is a pedestrian 15a who is about to cross the path 11 of the subject vehicle 10 (i.e., the lane in which the vehicle 10 is traveling), as a hazardous object, on a sidewalk 16 ahead around the path 11. In the following, the pedestrian 15a who is about to cross the path 11 may be referred to as a crossing pedestrian. According to the driver's evasive driving under normal conditions, the subject vehicle 10 initiates braking before the crossing pedestrian 15a, makes a brief stop before the crosswalk (if any), or makes a brief stop or moves slowly when there is no crosswalk, so as not to obstruct the pedestrian 15a crossing the path 11. If the TTC when the subject vehicle 10 initiates braking before the crossing pedestrian 15a is greater or equal to the time threshold described in the first embodiment, it can be said that the driver is performing evasive driving under normal conditions.

In this case, the learning unit 6 stores the TTC when the driver initiates braking before the crossing pedestrian 15a in a predefined folder TTCf set in the memory as a feature of driver's evasive driving under normal conditions, and calculates the TTC learned value TTCf_1 based on that TTCf.

Next, FIG. 21 illustrates another scene following the scene illustrated in FIG. 20, with the subject vehicle 10 moving continuously from the scene in FIG. 20. As illustrated in FIG. 21, a crossing pedestrian 15b, different from the one shown in FIG. 20, is present on the sidewalk 16 ahead around the path 11 (i.e., the lane in which the subject vehicle 10 is traveling) and is about to cross the path 11 of the vehicle 10. In this case, the driver's concentration level on driving may drop due to impatience or the like, leading to a decreased TTC. If the TTC as a feature of driver's evasive driving is less than the TTC learned value TTCf_1 acquired by learning in the scene illustrated in FIG. 20, the concentration level determination unit 4 determines that the driver's concentration level on driving is dropping.

In such a case, the notification unit 5 controls the in-vehicle speaker or the like and provides a notification to encourage safe driving. The notification may be provided before the subject vehicle 10 passes by the crossing pedestrian 15b (i.e., when the vehicle is approaching the crossing pedestrian 15b) or after the vehicle passes by the crossing pedestrian 15b. This allows the driving assistance device 1 to encourage the driver to restore his/her driving concentration in later driving.

An example of the routine performed by the driving assistance device 1 of the fourth embodiment will now be described with reference to FIGS. 22 to 25, where the crossing pedestrian 15 is a hazardous object, the TTC is a feature of driver's evasive driving, and the TTC learned value TTCf_1 is a learned value acquired from learning by the learning unit 6. This routine is performed repeatedly every predefined control cycle (e.g., every 100 ms).

Figure 22:
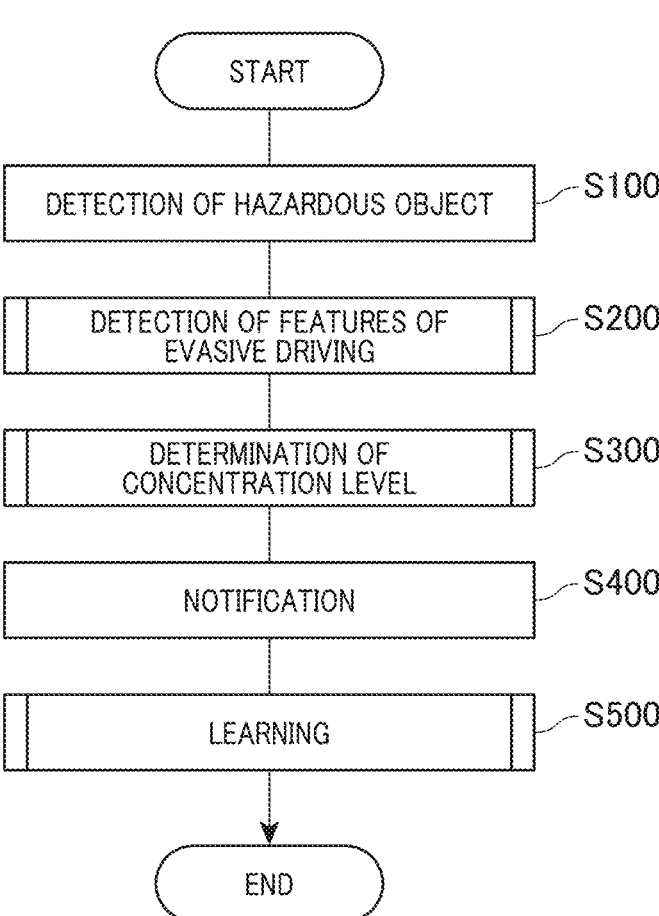
FIG. 22 is a flowchart of a routine performed by a driving assistance device according to a fourth embodiment.

At S100 in FIG. 22, the object detection unit 2 detects a hazardous object in the path of the subject vehicle 10 and surroundings of the path of the subject vehicle 10. The hazardous object is, for example, the crossing pedestrian 15.

Next, at S200, the evasive driving detection unit 3 detects the feature of driver's evasive driving to avoid the hazardous object. The process at S200 will now be described in detail with reference to FIG. 23.

Figure 23:
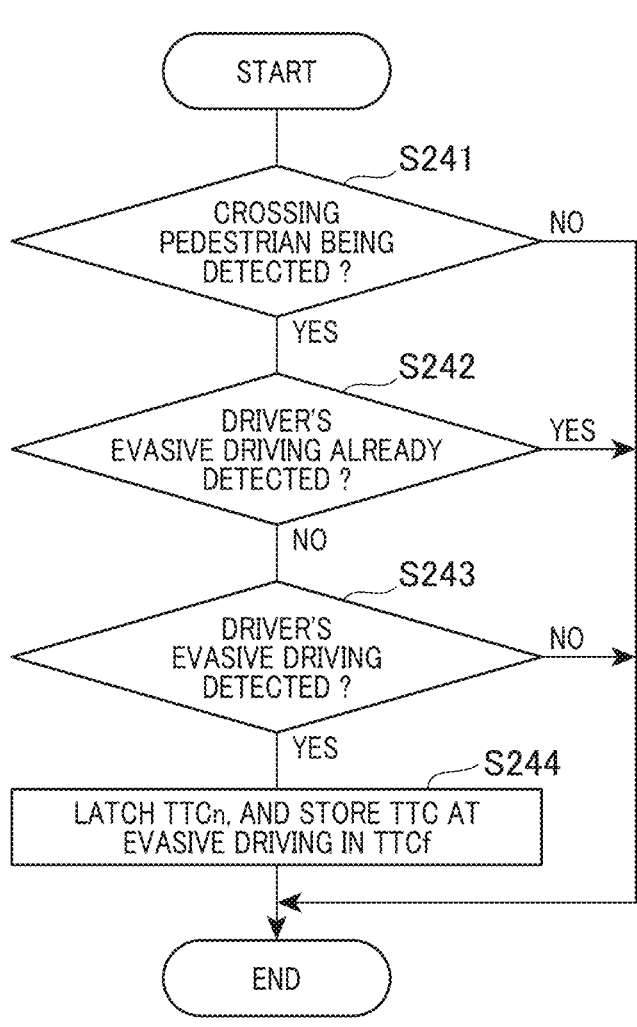
FIG. 23 is a flowchart illustrating a process at S200 in FIG. 22.

At S241 in FIG. 23, the evasive driving detection unit 3 determines whether the object detection unit 2 is detecting the crossing pedestrian 15 as a hazardous object. If at S241 the evasive driving detection unit 3 determines that the object detection unit 2 is detecting the crossing pedestrian 15, the process proceeds to S242.

At S242, the evasive driving detection unit 3 determines whether the driver's evasive driving has already been detected. If at S242 the evasive driving detection unit 3 determines that the driver's evasive driving has not been detected, the process proceeds to S243.

At S243, the evasive driving detection unit 3 determines whether the driver's evasive driving has been detected. If at S243 the evasive driving detection unit 3 determines that the driver's evasive driving has been detected, the process proceeds to S244.

At S244, the evasive driving detection unit 3 stores (latches), as a feature of driver's evasive driving, TTCn when the driver initiates braking before the crossing pedestrian 15 in the TTCf as the TTC at evasive driving to avoid the crossing pedestrian 15, and then the routine proceeds to S300.

If at S241 the evasive driving detection unit 3 determines that the object detection unit 2 is not detecting the crossing pedestrian 15, then the process at S200 ends. Thereafter, the routine proceeds to S300. On the other hand, if at S242 the evasive driving detection unit 3 determines that the driver's evasive driving has already been detected, the process at S200 ends. Thereafter, the routine proceeds to S300. If at S243 the evasive driving detection unit 3 determines that the driver's evasive driving has not been detected, the process at S200 ends. Thereafter, the routine proceeds to S300.

Returning to FIG. 22, at S300, the concentration level determination unit 4 determines a drop in the driver's concentration level on driving. The process at S300 will now be described in detail with reference to FIG. 24.

Figure 24:
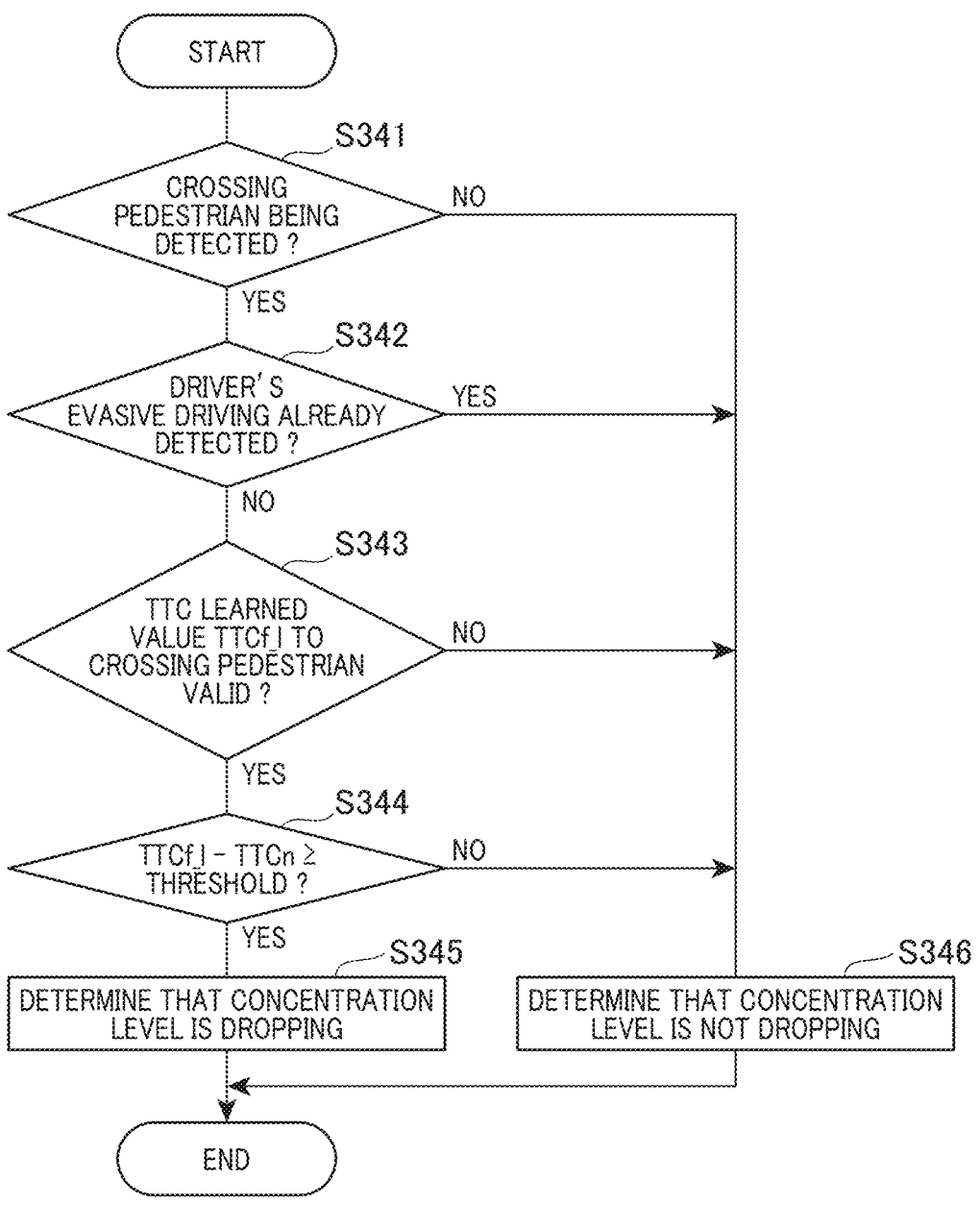
FIG. 24 is a flowchart illustrating a process at S300 in FIG. 22.

At S341 in FIG. 24, the concentration level determination unit 4 determines whether the object detection unit 2 is detecting the crossing pedestrian 15 as a hazardous object. If at S341 the concentration level determination unit 4 determines that the object detection unit 2 is detecting the crossing pedestrian 15, the process proceeds to S342. At S342, the concentration level determination unit 4 determines whether the evasive driving detection unit 3 has already detected the driver's evasive driving. If at S342 the concentration level determination unit 4 determines that the evasive driving detection unit 3 has not detected the driver's evasive driving, the process proceeds to S343.

At S343, the concentration level determination unit 4 determines whether the TTC learned value TTCf_1 acquired from learning by the learning unit 6 is valid. This determination is made, for example, based on whether the TTC learned value TTCf_1 has been updated a predefined number of times or more after the driving switch of the subject vehicle 10 is turned on. The number of times the TTC learned value TTCf_1 is updated is reset when the driving switch of the subject vehicle 10 is turned off. If the TTC learned value TTCf_1 has been updated the predefined number of times or more after the driving switch of the subject vehicle 10 is turned on, the concentration level determination unit 4 determines that the TTC learned value TTCf_1 is valid and the process then proceeds to S344.

At S344, the concentration level determination unit 4 determines whether the value acquired by subtracting the real-time TTCn to the crossing pedestrian 15 from the TTC learned value TTCf_1 (i.e., TTCf_1-TTCn) is greater than or equal to a predefined threshold. If at S344, the concentration level determination unit 4 determines that TTCf_1-TTCn is greater than or equal to the predefined threshold, the process proceeds to S345. The predefined threshold is zero or a positive number.

At S345, the concentration level determination unit 4 determines that the driver's concentration level on driving is dropping, the process at S300 ends. Thereafter, the routine proceeds to S400.

If at S341 the concentration level determination unit 4 determines that the object detection unit 2 is not detecting the crossing pedestrian 15, then the process proceeds to S346. If at S342 the concentration level determination unit 4 determines that the evasive driving detection unit 3 has already detected the driver's evasive driving, the process also proceeds to S346. If at S343 the concentration level determination unit 4 determines that the TTC learned value TTCf_1 acquired from learning by the learning unit 6 is not valid, the process also proceeds to S346. If at S344 the concentration level determination unit 4 determines that TTCf_1-TTCn is less than a predefined threshold, the process also proceeds to S346.

At S346, the concentration level determination unit 4 determines that the driver's concentration level on driving is not dropping, the process at S300 ends. Thereafter, the routine proceeds to S400.

Returning again to FIG. 22, if the concentration level determination unit 4 determines that the driver's concentration level on driving is dropping, the notification unit 5 provides a notification to encourage safe driving at S400. Thereafter, the routine proceeds to S500. On the other hand, if the concentration level determination unit 4 determines that the driver's concentration level on driving is not dropping, the notification unit 5 does not provide any notification. Thereafter, the routine proceeds to S500.

At S500, the learning unit 6 learns the features of driver's evasive driving under normal conditions. The process at S500 will now be described in detail with reference to FIG. 25.

Figure 25:
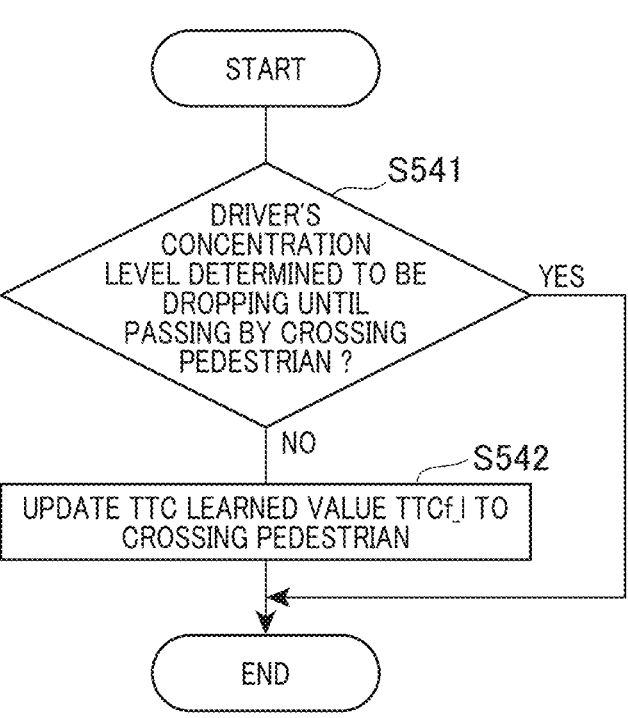
FIG. 25 is a flowchart illustrating a process at S500 in FIG. 22.

At S541 in FIG. 25, the learning unit 6 determines at the timing when the subject vehicle 10 has completed passing by the crossing pedestrian 15, whether the driver's concentration level on driving has been determined to be dropping in the process at S300 until the subject vehicle 10 passes by the crossing pedestrian 15. If at S541 the learning unit 6 determines that the driver's concentration level on driving has not been determined to be dropping until the subject vehicle 10 passes by the crossing pedestrian 15, then the process proceeds to S542.

At S542, the learning unit 6 updates the TTC learned value TTCf_1 with respect to the crossing pedestrian 15 using the TTCn when the subject vehicle 10 initiates braking before the crossing pedestrian 15. The case where the driver's concentration level on driving is not determined to be dropping means that the driver's concentration level on driving is normal. Therefore, if the driver's concentration level on driving has not been determined to be dropping, the TTC learned value TTCf_1 with respect to the crossing pedestrian 15 is updated using TTCf, which is a feature of driver's evasive driving under normal conditions. For example, a moving-average method is used to update the TTC learned value TTCf_1.

On the other hand, if at S541 the learning unit 6 determines at the timing when the subject vehicle 10 has completed passing by the crossing pedestrian 15, that the driver's concentration level on driving has been determined to be dropping in the process at S300 until the subject vehicle 10 passes by the crossing pedestrian 15, the process ends without updating the TTC learned value TTCf_1. In that case, the TTC learned value TTCf_1 is not updated because it is not a feature of driver's evasive driving under normal conditions.

After the process at S500, the routine in the current cycle ends. The routine is performed again from S100 in the subsequent control cycle.

The driving assistance device 1 of the fourth embodiment described above can provide the same advantages as in each of the second and third embodiments.

Fifth Embodiment

A fifth embodiment will now be described with reference to the accompanying drawings, focusing on differences from the first embodiment. In the present embodiment, the routine performed by the driving assistance device 1 is partially modified.

The driving assistance device 1 of the fifth embodiment image processes images of the driver's face captured by an imaging device (not shown) mounted to the subject vehicle, and determines the driver's concentration level on driving, including the driver's line of sight to a hazardous object when the subject vehicle 10 approaches the hazardous object. For example, the Driver Status Monitor (registered trademark) commercially available from Denso Corporation may be used as the imaging device, but other imaging devices may be used as well.

Figure 26:
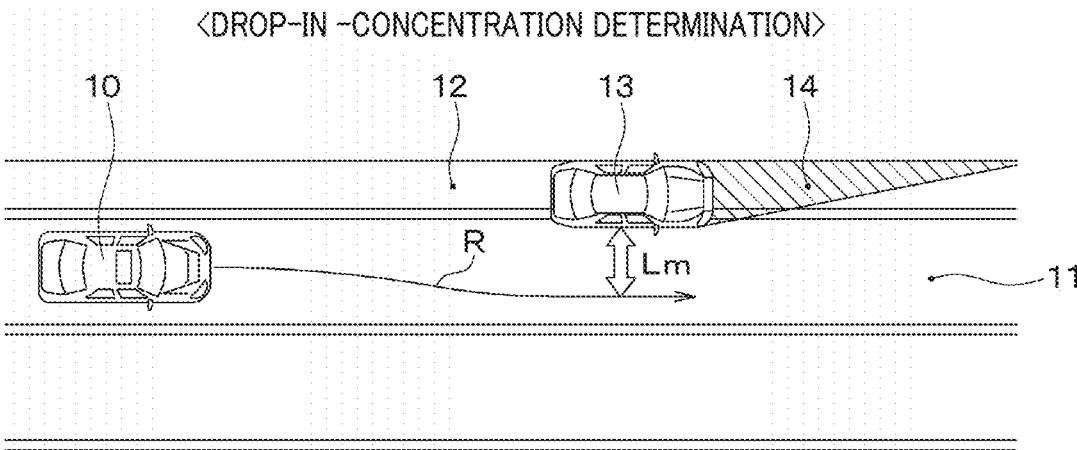
FIG. 26 is an illustration of making a drop-in-concentration determination when a subject vehicle approaches and passes by a shoulder-parked vehicle in the driving assistance device according to a fifth embodiment.
Figure 27:
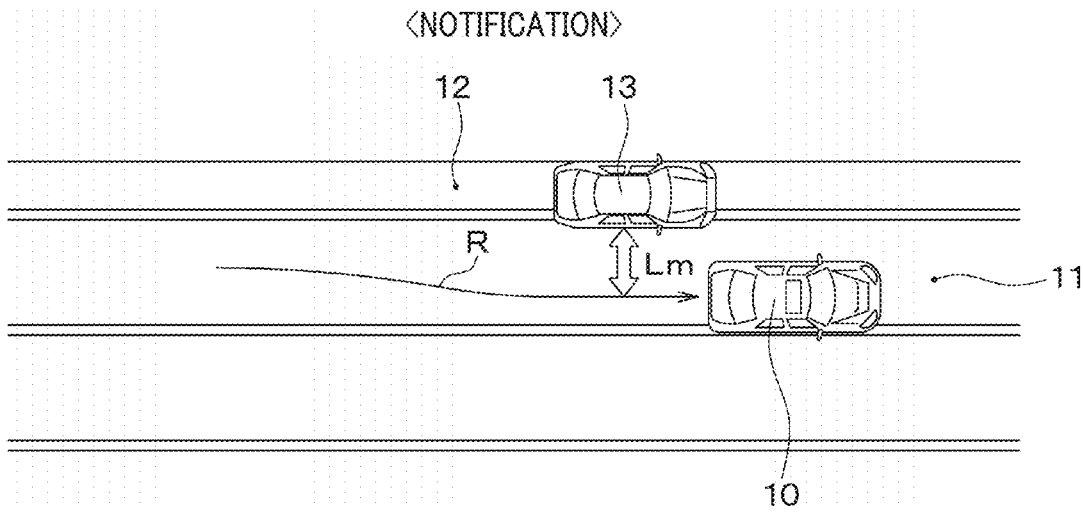
FIG. 27 is an illustration of providing a notification when the subject vehicle passes by the shoulder-parked vehicle, following the scene in FIG. 26.

FIGS. 26 and 27 illustrate a scenario where when the subject vehicle to which the driving assistance device 1 of the fifth embodiment is applied approaches and passes by a shoulder-parked vehicle 13, the driving assistance device 1 determines a drop in the driver's concentration on driving based on the features of driver's evasive driving and then provides a notification.

As illustrated in FIG. 26, a shoulder-parked vehicle 13 is parked on the shoulder 12 ahead around the path 11 of the subject vehicle 10 (i.e., a lane of travel in which the subject vehicle is traveling). In this case, there is a possibility that a pedestrian (not shown) or the like may emerge from the blind spot area 14 of the shoulder-parked vehicle 13. Therefore, it is preferable for safe driving that the subject vehicle 10 reduces the speed of the subject vehicle, keeps the lateral distance Lm between the shoulder-parked vehicle 13 and the subject vehicle 10 as large as possible, and passes by the shoulder-parked vehicle 13 while paying attention to the pedestrian or the like emerging from the blind spot area 14 of the shoulder-parked vehicle 13.

However, the driver's concentration level on driving may reduce due to impatience, etc., and the driver may pass by the shoulder-parked vehicle 13 with a short lateral distance Lm between the shoulder-parked vehicle 13 and the subject vehicle 10 without decelerating, as indicated by the arrow R in FIG. 2. The driver may pass by a shoulder-parked vehicle 13 without directing his/her line of sight to the shoulder-parked vehicle 13 and its blind spot area 14.

In the fifth embodiment, the concentration level determination unit 4 determines that the driver's concentration level on driving is low or is dropping when the lateral distance Lm as a feature of driver's evasive driving is less than the distance threshold. In addition, the concentration level determination unit 4 determines that the driver's concentration level on driving is dropping due to driver's insufficient (or poor) visibility of the shoulder-parked vehicle 13 and its blind spot 14 as the subject vehicle 10 approaches the shoulder-parked vehicle 13.

In such a case, after the subject vehicle 10 has passed by the shoulder-parked vehicle 13, the notification unit 5 controls the in-vehicle speaker or the like to provide a notification to encourage safe driving. This allows the driving assistance device 1 to encourage the driver to restore his/her driving concentration in later driving.

An example of the routine performed by the driving assistance device 1 of the fifth embodiment will now be described with reference to FIGS. 28 to 30, where the shoulder-parked vehicle 13 is a hazardous object and the lateral distance Lm is a feature of driver's evasive driving. This routine is performed repeatedly every predefined control cycle (e.g., every 100 ms).

Figure 28:
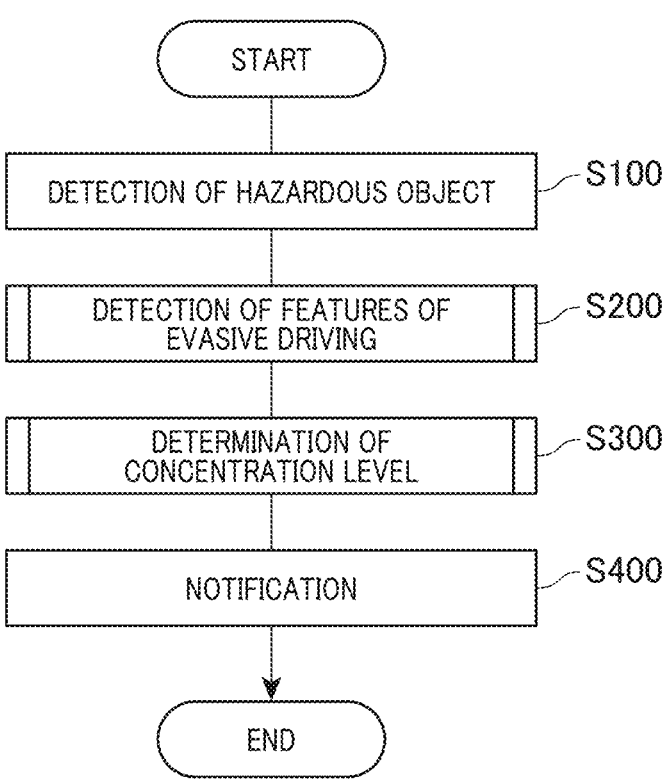
FIG. 28 is a flowchart of a routine performed by a driving assistance device according to a fifth embodiment.

At S100 in FIG. 28, the object detection unit 2 detects a hazardous object in the path of the subject vehicle 10 and surroundings of the path. The hazardous object is, for example, the shoulder-parked vehicle 13.

Next, at S200, the evasive driving detection unit 3 detects the feature of driver's evasive driving to avoid the hazardous object. The process at S200 will now be described in detail with reference to FIG. 29.

Figure 29:
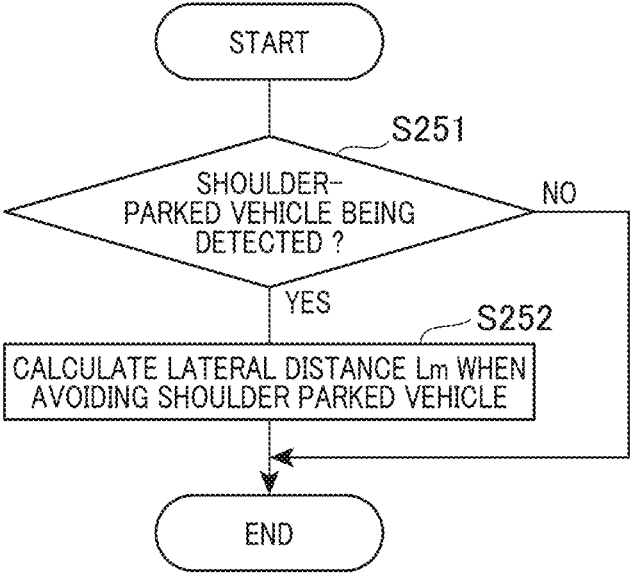
FIG. 29 is a flowchart illustrating a process at S200 in FIG. 28.

At S251 in FIG. 29, the evasive driving detection unit 3 determines whether the object detection unit 2 is detecting the shoulder-parked vehicle 13 as a hazardous object. If at S251 the evasive driving detection unit 3 determines that the object detection unit 2 is detecting the shoulder-parked vehicle 13, the process proceeds to S252. At S252, the evasive driving detection unit 3 calculates the lateral distance Lm when the subject vehicle 10 passes by the shoulder-parked vehicle 13, as a feature of driver's evasive driving, and then the process at S200 ends. Thereafter, the routine proceeds to S300. The evasive driving detection unit 3 stores in the memory the minimum value of the lateral distance Lm between the subject vehicle 10 and the shoulder-parked vehicle 13 detected before and after the subject vehicle 10 passes by the shoulder-parked vehicle 13.

If at S251 the evasive driving detection unit 3 determines that the object detection unit 2 is not detecting the shoulder-parked vehicle 13, then the process at S200 ends. Thereafter, the routine proceeds to S300.

Returning to FIG. 28, at S300, the concentration level determination unit 4 determines a drop in the driver's concentration level on driving. The process at S300 will now be described in detail with reference to FIG. 30.

Figure 30:
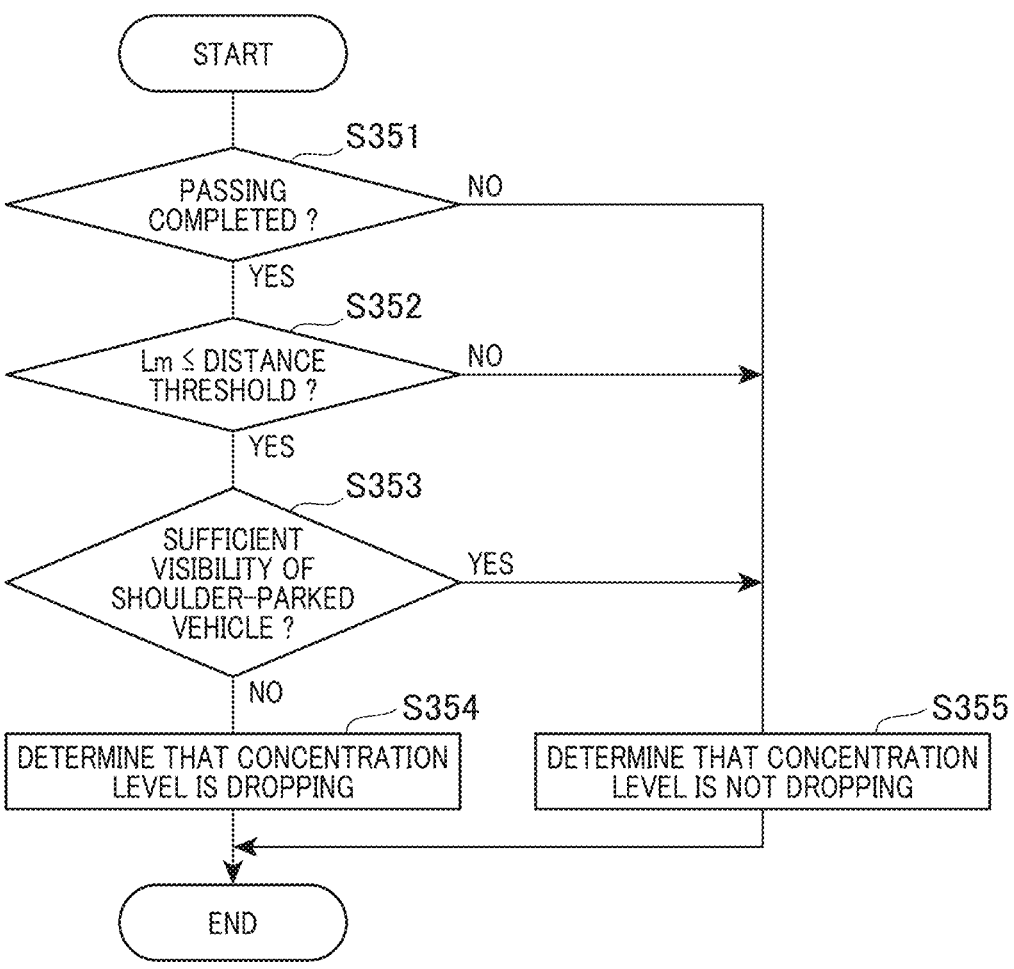
FIG. 30 is a flowchart illustrating a process at S300 in FIG. 28.

At S351 in FIG. 30, the concentration level determination unit 4 determines whether the subject vehicle 10 has completed passing by the shoulder-parked vehicle 13. If the concentration level determination unit 4 determines that the subject vehicle 10 has completed passing by the shoulder-parked vehicle 13, the process proceeds to S352.

At S352, the concentration level determination unit 4 determines whether the lateral distance Lm when the subject vehicle 10 passes by the shoulder-parked vehicle 13 is less than or equal to the distance threshold. If the concentration level determination unit 4 determines that the lateral distance Lm is less than or equal to the distance threshold, the process proceeds to S353.

At S353, the concentration level determination unit 4 image processes images of the driver's face captured by the imaging device when the subject vehicle 10 approaches the shoulder-parked vehicle 13, and determines whether the driver's visibility of the shoulder-parked vehicle 13 and its blind spot area 14 is sufficient. If the concentration level determination unit 4 determines that the driver's visibility of the shoulder-parked vehicle 13 and its blind spot area 14 is not sufficient, the process proceeds to S354.

At S354, the concentration level determination unit 4 determines that the driver's concentration level on driving is dropping, the process at S300 ends. Thereafter, the routine proceeds to S400.

On the other hand, if at S351 the concentration level determination unit 4 determines that the subject vehicle 10 has not completed passing by the shoulder-parked vehicle 13, i.e., the subject vehicle 10 is before passing (i.e., approaching) or is passing by the shoulder-parked vehicle 13, the process proceeds to S355. If at S352 the concentration level determination unit 4 determines that the lateral distance Lm when the subject vehicle 10 passes by the shoulder-parked vehicle 13 is greater than the distance threshold, the process proceeds to S355. In addition, if at S353, the concentration level determination unit 4 determines that the driver's visibility of the shoulder-parked vehicle 13 and its blind spot area 14 is sufficient, the process also proceeds to S355.

At S355, the concentration level determination unit 4 determines that the driver's concentration level on driving is not dropping, the process at S300 ends. Thereafter, the routine proceeds to S400.

Returning again to FIG. 28, if the concentration level determination unit 4 determines that the driver's concentration level on driving is dropping, the notification unit 5 provides a notification to encourage safe driving at S400. Thereafter, the routine proceeds to S500. On the other hand, if the concentration level determination unit 4 determines that the driver's concentration level on driving is not dropping, the notification unit 5 does not provide any notification. Thereafter, the routine proceeds to S500.

The driving assistance device 1 of the fifth embodiment described above determines a drop in the driver's concentration level on driving based on the features of driver's evasive driving as well as the driver's line of sight to the hazardous object when the subject vehicle 10 approaches the hazardous object.

This allows the concentration level determination unit 4 to detect whether the driver is paying attention to the hazardous object based on the driver's line of sight when the subject vehicle 10 approaches the hazardous object. Therefore, the accuracy of determination of the driver's concentration level on driving can be improved as the direction in which the driver's line of sight is directed can be accurately determined.

Sixth Embodiment

A fifth embodiment will now be described with reference to the accompanying drawings, focusing on differences from the first embodiment. In the present embodiment, the driving assistance device 1 has the same configuration as in each of the second to fourth embodiments, but the routine is partially modified.

Figure 31:
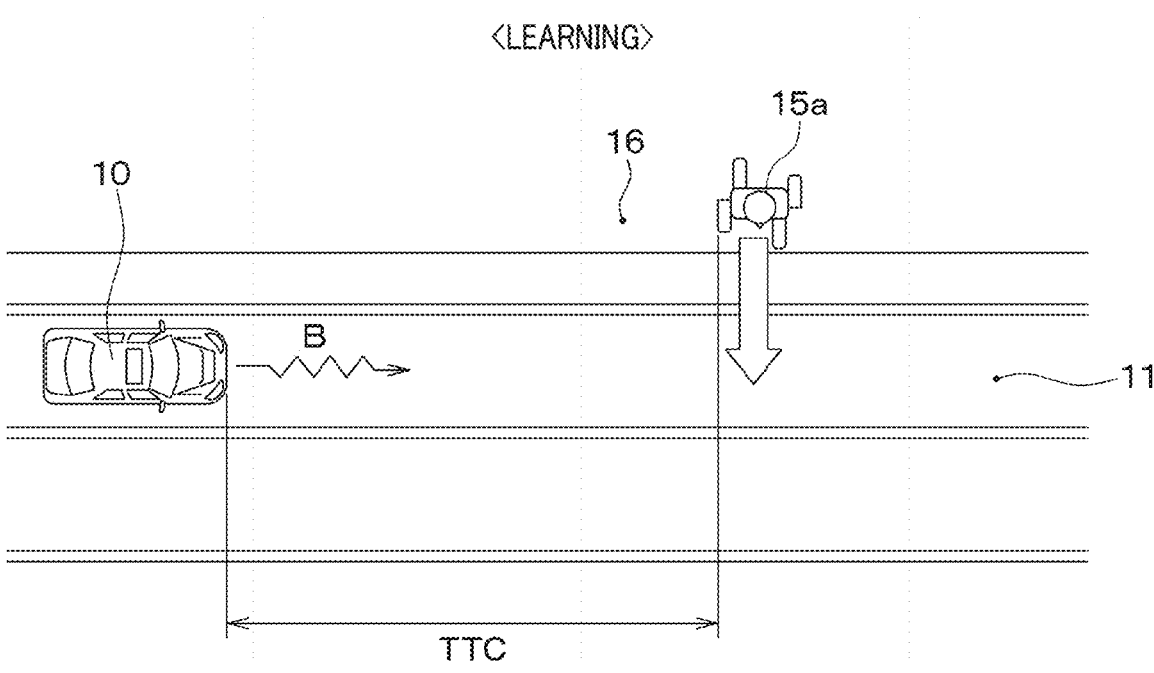
FIG. 31 is an illustration of learning features of driver's evasive driving when there is a pedestrian around a path of a subject vehicle, who is about to cross the path, in a driving assistance device according to a sixth embodiment.
Figure 34:
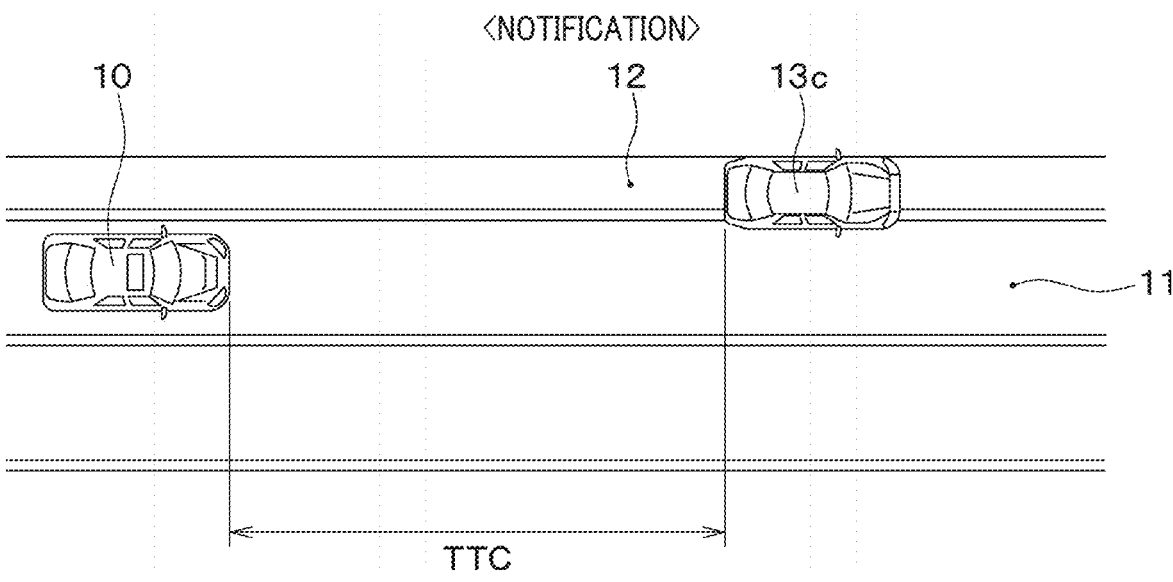
FIG. 34 is an illustration of providing a notification when the subject vehicle passes by a shoulder-parked vehicle, in a scene different from each of the scenes in FIGS. 31 and 32.

FIGS. 31 and 34 illustrate a scene where the driving assistance device 1 learns the features of driver's evasive driving when the subject vehicle 10 to which the driving assistance device 1 of the sixth embodiment is applied approaches and passes by a crossing pedestrian 15, and then determines a drop in the driver's concentration level on driving and then provides the notification.

As illustrated in FIG. 31, there is a crossing pedestrian 15a who is about to cross the path 11 of the subject vehicle 10 (i.e., the lane in which the subject vehicle 10 is traveling), as a hazardous object, on a sidewalk 16 ahead around the path 11. According to the driver's evasive driving under normal conditions, the subject vehicle 10 initiates braking before the crossing pedestrian 15a, makes a brief stop before the crosswalk (if any), or makes a brief stop or moves slowly when there is no crosswalk, so as not to obstruct the pedestrian 15a crossing the path 11. If the TTC when the subject vehicle 10 initiates braking before the crossing pedestrian 15a is greater or equal to the time threshold described in the first embodiment, it can be said that the driver is performing evasive driving under normal conditions.

In this case, the learning unit 6 stores the TTC when the driver initiates braking before the crossing pedestrian 15a in a predefined folder TTCf set in the memory as a feature of driver's evasive driving under normal conditions, and calculates the TTC learned value TTCf_1 based on that TTCf.

Figure 32:
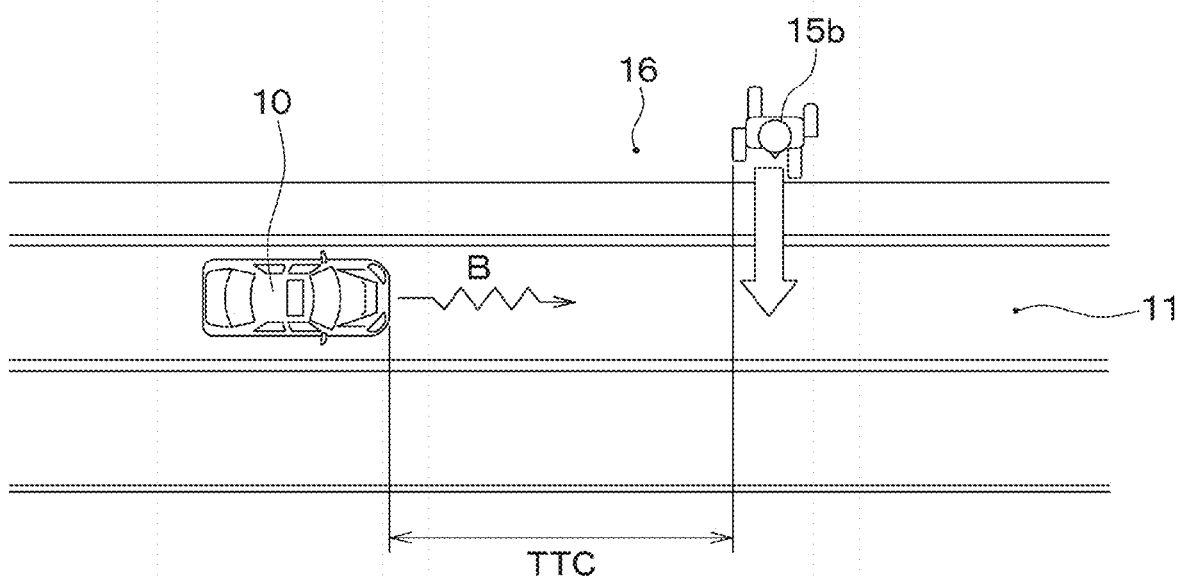
FIG. 32 is an illustration of making a drop-in-concentration determination and providing a notification when there is a pedestrian around a path of a subject vehicle, who is about to cross the path, in a scene different from the scene in FIG. 31.

Next, FIG. 32 illustrates another scene following the scene illustrated in FIG. 20, with the subject vehicle 10 moving continuously from the scene in FIG. 31. As illustrated in FIG. 32, a crossing pedestrian 15b, different from the one shown in FIG. 31, is present on the sidewalk 16 ahead around the path 11 (i.e., the lane in which the subject vehicle 10 is traveling) and is about to cross the path 11 of the vehicle 10. In this case, the driver's concentration level on driving may drop due to impatience or the like, leading to a decreased TTC. If the TTC as a feature of driver's evasive driving is less than the TTC learned value TTCf_1 acquired by learning in the scene illustrated in FIG. 31, the concentration level determination unit 4 determines that the driver's concentration level on driving is dropping.

Figure 33:
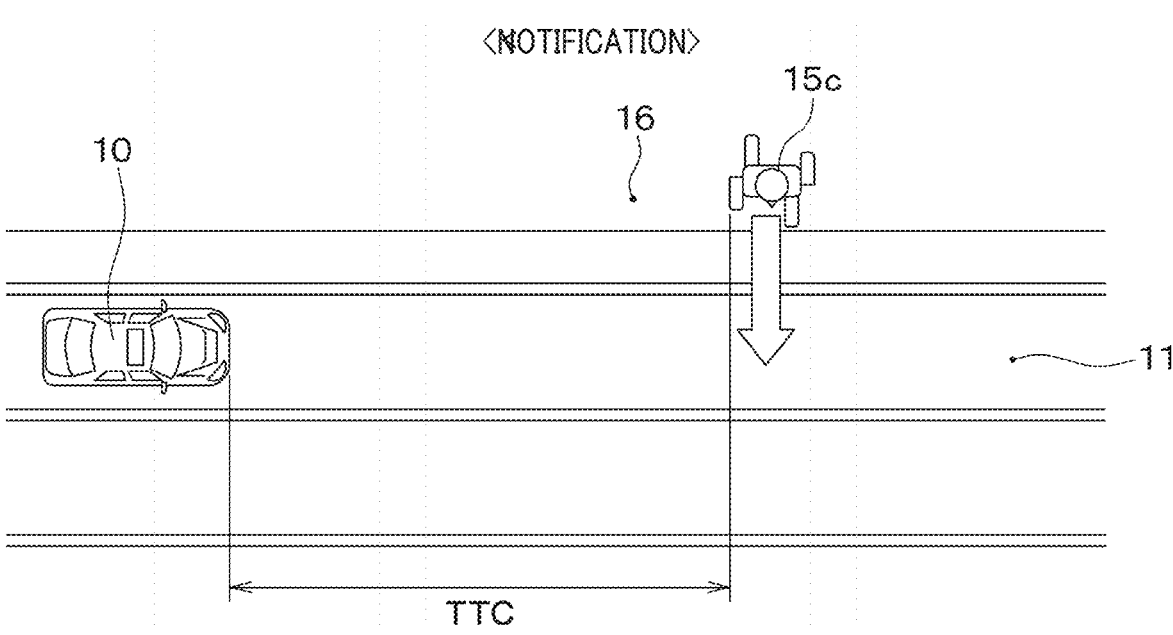
FIG. 33 is an illustration of providing a notification when there is a pedestrian around a path of a subject vehicle, who is about to cross the path, in a scene different from each of the scenes in FIGS. 31 and 32.

Subsequently, FIG. 33 illustrates a scene, different from the scenes in FIG. 31 and FIG. 32, after passing through the scene in FIG. 32 and before a predefined time (e.g., 30 minutes) elapses after passing through the scene in FIG. 32. As an alternative, FIG. 33 illustrates a scene different from the scenes in FIG. 31 and FIG. 32, after the scene in FIG. 32 in which the driver's concentration level on driving is determined to be dropping, has been repeated a predefined number of times or more in succession.

In FIG. 33, a pedestrian 15c on the sidewalk 16 ahead around the path of the subject vehicle 10, different from the one shown in FIGS. 31 and 32, is about to cross the path 11 of the subject vehicle 10. In this case, when the object detection unit 2 detects the crossing pedestrian 15c as a hazardous object, the notification unit 5 controls the in-vehicle speaker or the like to provide a notification to encourage safe driving when the TTC of the subject vehicle 10 with respect to the crossing pedestrian 15c is less than or equal to the predefined value. This allows the driving assistance device 1 to prevent occurrence of an accident by providing a notification to encourage safe driving in plenty of time before the subject vehicle 10 passes by the crossing pedestrian 15c (i.e., while approaching).

FIG. 34, like FIG. 33, also illustrates a scene different from the scenes in FIG. 31 and FIG. 32, after passing through the scene in FIG. 32 and before a predefined time (e.g., 30 minutes) elapses after passing through the scene in FIG. 32. As alternative, FIG. 34 may illustrate a different scene from the scenes in FIGS. 31 and 32, after the scene in FIG. 32, in which the driver's concentration level on driving is determined to be dropping, has been repeated a predefined number of times or more in succession.

In FIG. 34, a shoulder-parked vehicle 13c is parked on the shoulder 12 ahead around the path 11 in which the subject vehicle 10 is traveling. In this case, when the object detection unit 2 detects the shoulder-parked vehicle 13c as a hazardous object, the notification unit 5 controls the in-vehicle speaker or the like to provide a notification to encourage safe driving when the TTC of the subject vehicle 10 with respect to the shoulder-parked vehicle 13c is less or equal to the predefined value. This allows the driving assistance device 1 to prevent occurrence of an accident by providing a notification to encourage safe driving in plenty of time before the subject vehicle 10 passes by the shoulder-parked vehicle 13c (i.e., while approaching).

An example of the routine performed by the driving assistance device 1 of the sixth embodiment will now be described with reference to FIGS. 35 and 36. This routine is performed repeatedly every predefined control cycle (e.g., every 100 ms).

Figure 35:
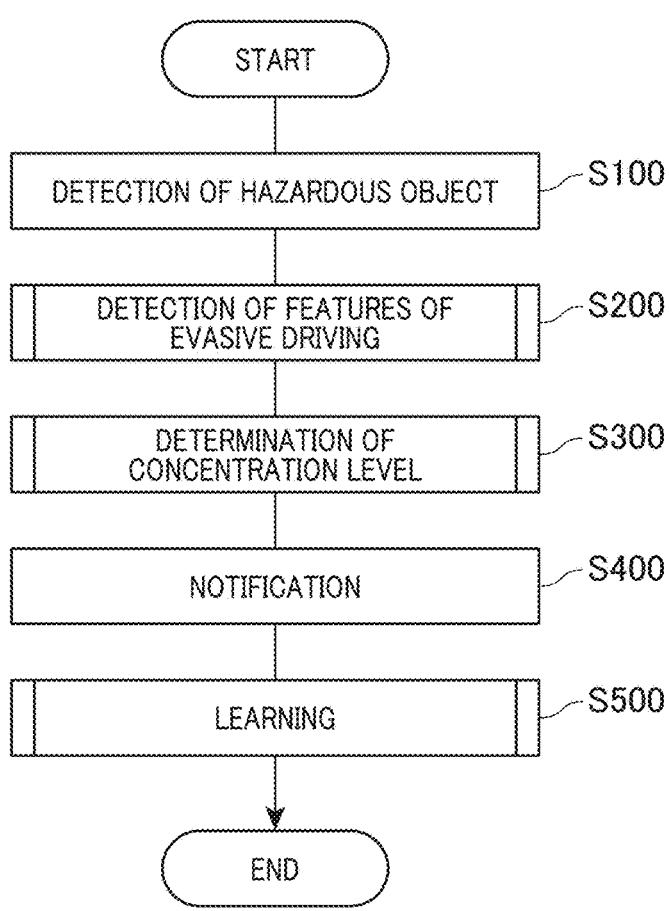
FIG. 35 is a flowchart of a routine performed by a driving assistance device according to a sixth embodiment.

At S100 in FIG. 35, the object detection unit 2 detects a hazardous object in the path of the subject vehicle 10 and surroundings of the path of the subject vehicle 10.

Next, at S200, the evasive driving detection unit 3 detects the feature of driver's evasive driving to avoid the hazardous object. The process at S200 is performed as described with reference to FIG. 11, 17 or 23 in the second through fourth embodiments.

At S300, the concentration level determination unit 4 determines a drop in the driver's concentration level on driving. The process at S300 is performed in the same manner as the process described with reference to FIG. 12, 18 or 24 in the second through fourth embodiments.

Figure 36:
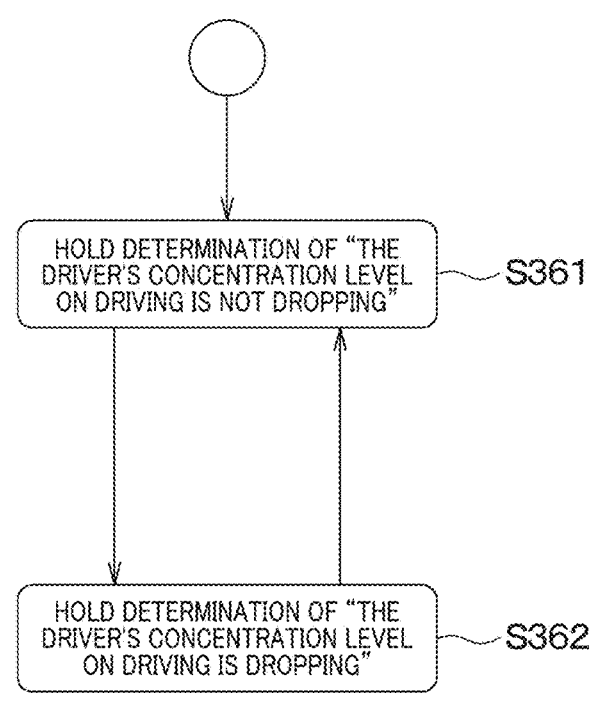
FIG. 36 is a state transition diagram for the process at S300 in FIG. 35.

Furthermore, at S300 in FIG. 36, the concentration level determination unit 4 holds the determination of "the driver's concentration level on driving is not dropping" under a predefined condition at S361. Also, at S300, the concentration level determination unit 4 holds the determination of "the driver's concentration level on driving is dropping" under a predefined condition at S361.

At S361, the predefined condition for holding the determination of "the driver's concentration level on driving is not dropping" is that the determination that the features of driver's evasive driving detected by the evasive driving detection unit 3 meet the features of driver's evasive driving learned by the learning unit 6 has been made a predefined number Y of times or more in succession. The predefined number Y is set to an integer greater than one.

As an alternative, the predefined condition for holding the determination of "the driver's concentration level on driving is not dropping" at S361 may be that a predefined time (e.g., 30 minutes) has elapsed from the start of holding the determination of "the driver's concentration level on driving is dropping".

On the other hand, the predefined condition for holding the determination of "the driver's concentration level on driving is dropping" at S362 is that the determination that the features of driver's evasive driving detected by the evasive driving detection unit 3 do not meet the features of driver's evasive driving learned by the learning unit 6 has been made more than the predefined number X of times or more in succession. The predefined number X is also set to be an integer greater than one. The predefined numbers X and Y may be the same or may be different.

Next, if all of the following requirements (A), (B), and (C) are met at S400, then the notification unit 5 provides a notification to encourage safe driving, and the routine proceeds to S500. On the other hand, if at least one of the following requirements (A), (B), and (C) is not met, then the notification unit 5 does not provide the notification, and the routine proceeds to S500.

(A) The object detection unit 2 has detected a hazardous object (e.g., shoulder-parked vehicle 13 or crossing pedestrian 15).

(B) The concentration level determination unit 4 is holding the determination of "the driver's concentration level on driving is dropping".

(C) The TTC with respect to the hazardous object is less than or equal to a predefined value. The predefined value is set, for example, as a value at which contact with the hazardous object can be avoided if the driver performs evasive driving after receiving the notification.

Next, at S500, the learning unit 6 learns the features of driver's evasive driving under normal conditions. The process at S500 is the same as those described with reference to FIG. 13, 19 or 25 in the second through fourth embodiments.

After S500, the routine ends. Thereafter, the routine is performed repeatedly again from S100 in the subsequent control cycle.

The driving assistance device 1 of the sixth embodiment described above can provide the following advantages.

(1) In the sixth embodiment, the concentration level determination unit 4 can hold the determination that the driver's concentration level on driving is dropping for a predefined time. When the concentration level determination unit 4 is holding the determination of "the driver's concentration level on driving is dropping," the notification unit 5, when the object detection unit 2 detects a hazardous object, provides a notification to encourage safe driving before the subject vehicle 10 passes by the hazardous object. The phrase "before the subject vehicle 10 passes by the object" means, for example, when the TTC with respect to the hazardous object is less than or equal to a predefined value.

This allows the driving assistance device 1 to prevent occurrence of an accident by providing a notification to encourage safe driving in plenty of time before the subject vehicle 10 passes by the hazardous object (i.e., while approaching).

The predefined time may be arbitrarily set to, for example, 10 minutes, 30 minutes, 1 hour, or a time until the driving switch is turned off.

(2) In the sixth embodiment, the concentration level determination unit 4 can hold the determination of "the driver's concentration level on driving is dropping" under a predefined condition. The predefined condition is that the determination that the features of driver's evasive driving detected by the evasive driving detection unit 3 do not meet the features of driver's evasive driving learned by the learning unit 6 has been made a predefined number X of times or more in succession. The predefined number X is an integer greater than one.

The concentration level determination unit 4 can hold the determination of "the driver's concentration level on driving is not dropping" under a predefined condition. The predefined condition is that the determination unit that the features of driver's evasive driving detected by the evasive driving detection unit 3 meet the features of driver's evasive driving learned by the learning unit 6 has been made a predefined number Y of times or more in succession. The predefined number Y is an integer greater than one.

When the concentration level determination unit 4 is holding the determination of "the driver's concentration level on driving is dropping," the notification unit 5, when the object detection unit 2 detects the object, provides a notification to encourage safe driving before the subject vehicle 10 passes by the object.

This allows the driving assistance device 1 to prevent occurrence of an accident by providing a notification to encourage safe driving in plenty of time before the subject vehicle 10 passes by the hazardous object (i.e., while approaching).

Seventh Embodiment

The seventh embodiment will now be described. The seventh embodiment is a modification of the sixth embodiment.

FIGS. 37 to 40 illustrate a scene where the driving assistance device 1 learns the features of driver's evasive driving when the subject vehicle 10 to which the driving assistance device 1 of the seventh embodiment is applied approaches and passes by the shoulder-parked vehicle 13, and then determines a drop in the driver's concentration level on driving and then provides the notification.

Figure 37:
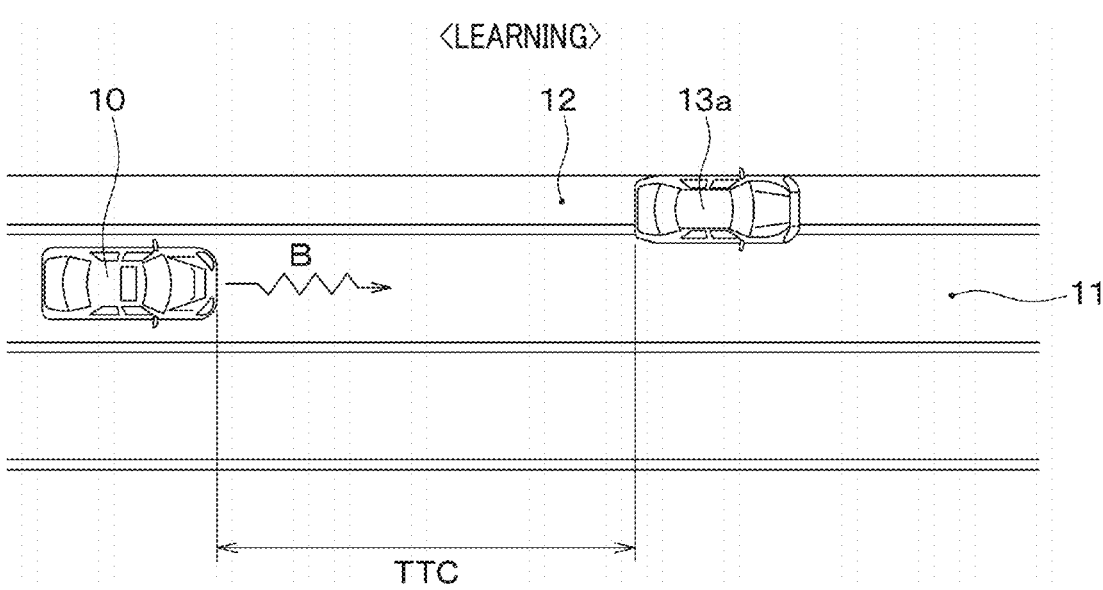
FIG. 37 is an illustration of learning features of driver's evasive driving when a subject vehicle approaches and passes by a shoulder-parked vehicle in a driving assistance device according to a seventh embodiment.

As illustrated in FIG. 37, a shoulder-parked vehicle 13a as a hazardous object is parked on the shoulder 12 ahead around the path 11 of the subject vehicle 10 (i.e., a lane of travel in which the subject vehicle is traveling). According to the driver's evasive driving under normal conditions, the subject vehicle 10 decelerates before the shoulder-parked vehicle 13a and passes by the shoulder-parked vehicle 13a with the lateral distance Lm between the shoulder-parked vehicle 13a and the subject vehicle 10 being as large as possible. In cases where the TTC when the subject vehicle 10 initiates braking before the shoulder-parked vehicle 13a is greater than or equal to the time threshold described in the first embodiment, it can be said that the driver is performing evasive driving under normal conditions. In addition, in cases where the lateral distance Lm when the subject vehicle 10 passes by the shoulder-parked vehicle 13a is greater than or equal to the distance threshold described in the first embodiment, it can be said that the driver is performing evasive driving under normal conditions.

In this case, the learning unit 6 stores the TTC when the driver initiates braking before the shoulder-parked vehicle 13a in TTCf as a feature of driver's evasive driving under normal conditions, and calculates the TTC learned value TTCf_1 based on that TTCf. The learning unit 6 may store the lateral distance Lm when the subject vehicle 10 passes by the shoulder-parked vehicle 13a as a feature of driver's evasive driving under normal conditions, and calculate the lateral distance learned value Lm_1.

Figure 38:
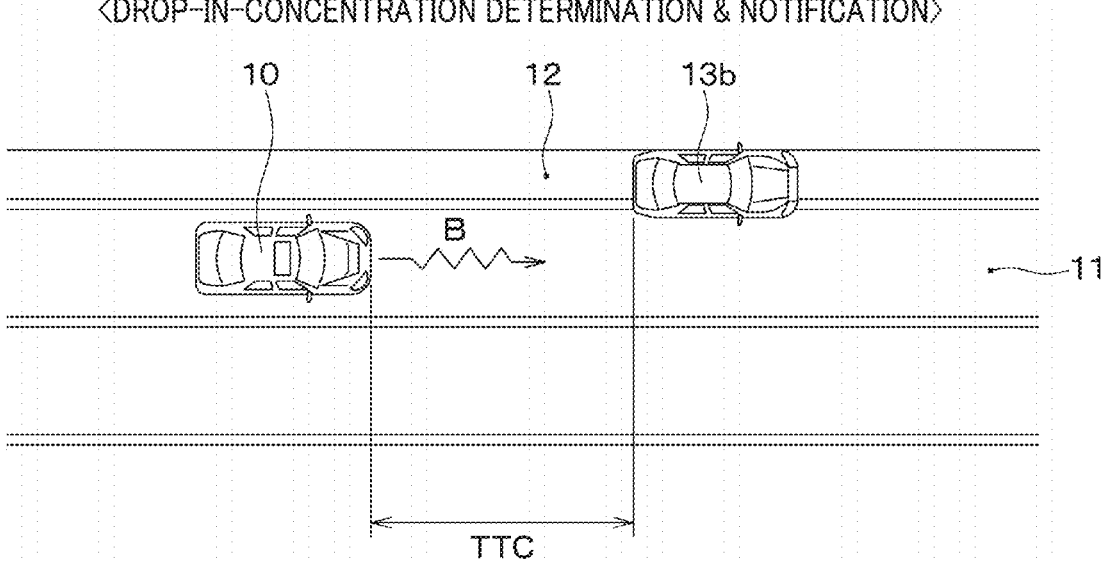
FIG. 38 is an illustration of making a drop-in-concentration determination and providing a notification when a subject vehicle approaches and passes by a shoulder-parked vehicle in a scene different from the scene in FIG. 37.

Next, FIG. 38 illustrates another scene following the scene illustrated in FIG. 37, with the subject vehicle 10 moving continuously from the scene in FIG. 37. As illustrated in FIG. 38, a different shoulder-parked vehicle 13b than the one illustrated in FIG. 37 is parked on the shoulder 12 ahead around the path 11 in which the subject vehicle 10 is traveling. In this case, the driver's concentration level on driving may drop due to impatience or the like, leading to a decreased TTC. If the TTC as a feature of driver's evasive driving is less than the TTC learned value TTCf_1 acquired by learning in the scene illustrated in FIG. 37, the concentration level determination unit 4 determines that the driver's concentration level on driving is dropping.

Figure 39:
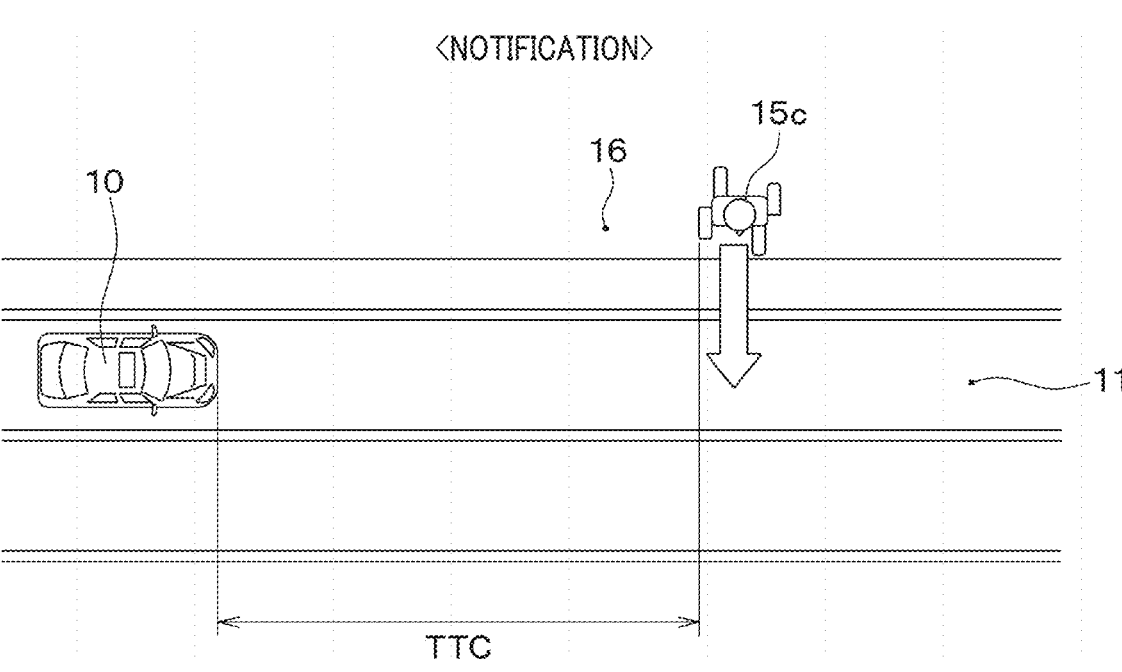
FIG. 39 is an illustration of providing a notification when there is a pedestrian around a path of a subject vehicle, who is about to cross the path, in a scene different from each of the scenes in FIGS. 37 and 38.

Subsequently, FIG. 39 illustrates a scene, different from the scenes in FIG. 37 and FIG. 38, after passing through the scene in FIG. 38 and before a predefined time (e.g., 30 minutes) elapses after passing through the scene in FIG. 38. As an alternative, FIG. 39 illustrates a scene different from the scenes in FIG. 37 and FIG. 38, after the scene in FIG. 38 in which the driver's concentration level on driving is determined to be dropping, has been repeated a predefined number of times or more in succession.

In FIG. 39, a pedestrian 15c on the sidewalk 16 ahead around the path of the subject vehicle 10 is about to cross the path 11 of the subject vehicle 10. In this case, when the object detection unit 2 detects the crossing pedestrian 15c as a hazardous object, the notification unit 5 controls the in-vehicle speaker or the like to provide a notification to encourage safe driving when the TTC of the subject vehicle 10 with respect to the hazardous object is less than or equal to the predefined value. This allows the driving assistance device 1 to prevent occurrence of an accident by providing a notification to encourage safe driving in plenty of time before the subject vehicle 10 passes by the crossing pedestrian 15c (i.e., while approaching).

Figure 40:
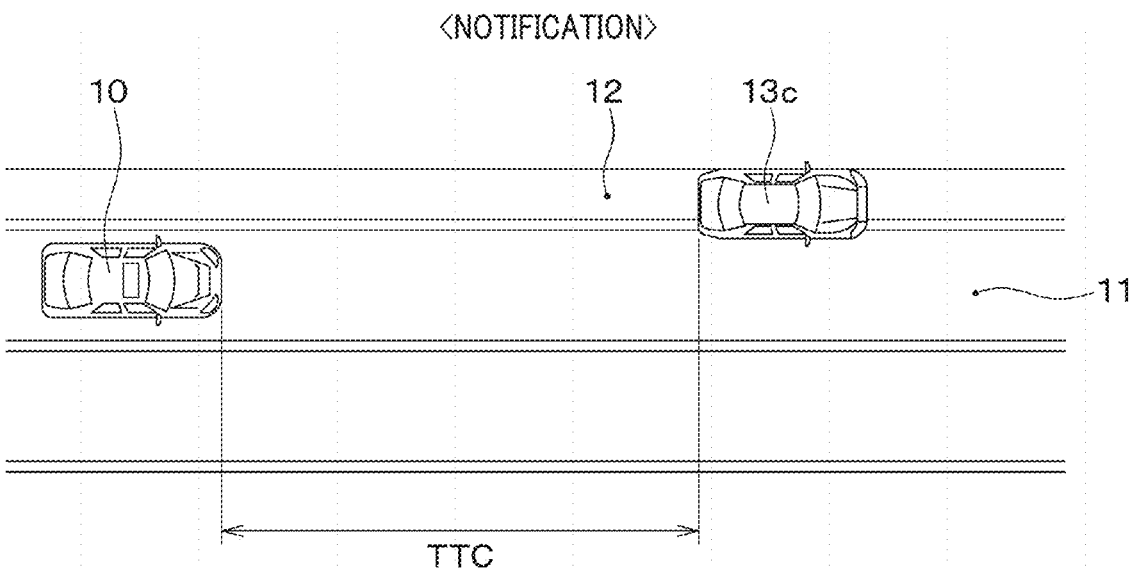
FIG. 40 is an illustration of providing a notification when the subject vehicle approaches a shoulder-parked vehicle, in a scene different from each of the scenes in FIGS. 37 and 38.

FIG. 40, like FIG. 33, also illustrates a scene different from the scenes in FIGS. 37 and 38, after passing through the scene in FIG. 38 and before a predefined time (e.g., 30 minutes) elapses after passing through the scene in FIG. 38. As alternative, FIG. 40 may illustrate a different scene from the scenes in FIGS. 37 and 38, after the scene in FIG. 38 in which the driver's concentration level on driving is determined to be dropping, has been repeated a predefined number of times or more in succession.

In FIG. 40, a shoulder-parked vehicle 13c is parked on the shoulder 12 ahead around the path 11 in which the subject vehicle 10 is traveling. In this case, when the object detection unit 2 detects the shoulder-parked vehicle 13c as a hazardous object, the notification unit 5 controls the in-vehicle speaker or the like to provide a notification to encourage safe driving when the TTC of the subject vehicle 10 with respect to the shoulder-parked vehicle 13c is less or equal to the predefined value. This allows the driving assistance device 1 to prevent occurrence of an accident by providing a notification to encourage safe driving in plenty of time before the subject vehicle 10 passes by the shoulder-parked vehicle 13c (i.e., while approaching).

The driving assistance device 1 of the seventh embodiment described above can provide the same advantages as in the sixth embodiment.

Other Embodiments (1) In each of the above embodiments, the number of times the learned value is updated has been described as being reset when the driving switch of the subject vehicle is turned off. As an alternative, the number of times the learned value is updated may be reset by a predefined switching operation or at a pre-defined timing, or may not be reset.

(2) In each of the above embodiments, the moving average method has been used for updating the learned values. As an alternative, various averaging methods, such as the gross average method, a predefined function, the median, the mode, etc., may be used for updating the learned values.

(3) In each of the above embodiments, the driving assistance device has been described as being configured as an electronic control device mounted to the vehicle. As an alternative, the driving assistance device may, for example, assist the driver in driving the subject vehicle through communications between a server and the subject vehicle.

(4) In each of the above embodiments, the driving assistance device 1 has been described as being configured as a single electronic control device mounted to the vehicle. Alternatively, the driving assistance device 1 may be configured as a combination of a plurality of electronic control devices.

Note that the present disclosure is not limited to the above-described embodiments, and it can be modified as appropriate. In addition, the above embodiments are not irrelevant to each other, and they can be appropriately combined unless the combination is clearly impossible. It is needless to say that the elements constituting the embodiments are not necessarily essential unless explicitly stated as essential or obviously considered essential in principle. In addition, when a numerical value such as the number, value, amount, or range of a component(s) of any of the above-described embodiments is mentioned, it is not limited to the particular number or value unless expressly stated otherwise or it is obviously limited to the particular number or value in principle, etc. When the shape, positional relationship, or the like of a component(s) or the like of any of the embodiments is mentioned, it is not limited to the shape, positional relationship, or the like unless explicitly stated otherwise or it is limited to the specific shape, positional relationship, or the like in principle, etc.

The control device and the method thereof described in the present disclosure may be realized by a dedicated computer provided by configuring a processor and memory programmed to perform one or more functions embodied in a computer program. Alternatively, the control device and the method thereof described in the present disclosure may be realized by a dedicated computer provided by configuring a processor with one or more dedicated hardware logic circuits. Alternatively, the control device and the method thereof described in the present disclosure may be realized by one or more dedicated computers configured by a combination of a processor and memory programmed to perform one or more functions, and a processor configured with one or more hardware logic circuits. In addition, the computer program may be stored in a computer-readable, non-transitory tangible storage medium as instructions to be executed by a computer.

What is claimed is:

1. A driving assistance device for a vehicle, comprising:
an object detection unit configured to detect a hazardous object that is capable of causing an accident in a path of a subject vehicle and surroundings of the path, the subject vehicle being the vehicle to which the driving assistance device is applied;
an evasive driving detection unit configured to detect features of driver's evasive driving, in which a driver of the subject vehicle performs driving operations to avoid a danger of the accident when the subject vehicle approaches and passes by the hazardous object detected by the object detection unit;
a concentration level determination unit configured to determine a concentration level of the driver on driving based on the features of driver's evasive driving detected by the evasive driving detection unit;
a notification unit configured to, when the concentration level determination unit determines that the concentration level of the driver on driving is dropping, provide a notification to encourage safe driving; and
a learning unit configured to learn the features of driver's evasive driving under normal conditions, wherein
the concentration level determination unit is configured to compare the features of driver's evasive driving under normal conditions learned by the learning unit with the features of driver's evasive driving detected by the evasive driving detection unit to determine that the concentration level of the driver on driving is dropping.

2. The driving assistance device according to claim 1, wherein
the learning unit is configured to, when the features of driver's evasive driving do not meet a predefined criterion, not reflect the features of evasive driving at that time in learning, and when the features of driver's evasive driving meet the predefined criterion, reflect the features of evasive driving at that time in learning.

3. The driving assistance device according to claim 1, wherein
the concentration level determination unit is configured to determine a drop in the concentration level of the driver on driving based not only on the features of driver's evasive driving, but also on a line of sight of the driver to the hazardous object when the subject vehicle approaches the hazardous object.

4. The driving assistance device according to claim 1, wherein
the concentration level determination unit is configured to hold, for a predefined time, a determination that the concentration level of the driver on driving is dropping, and
the notification unit is configured to, when the object detection unit detects the hazardous object during the concentration level determination unit holding the determination that the concentration level of the driver on driving is dropping, provide the notification to encourage safe driving before the subject vehicle passes by the hazardous object.

5. The driving assistance device according to claim 1, wherein the concentration level determination unit is configured to, when a determination that the features of driver's evasive driving detected by the evasive driving detection unit do not meet the features of driver's evasive driving learned by the learning unit has been made a first predefined number of times or more in succession, hold a determination that the concentration level of the driver on driving is dropping, and when a determination that the features of driver's evasive driving detected by the evasive driving detection unit meet the features of driver's evasive driving learned by the learning unit has been made a second predefined number of times or more in succession, hold a determination that the concentration level of the driver on driving is not dropping, with the first and second predefined numbers being integers greater than one, and the notification unit is configured to, when the object detection unit detects the hazardous object during the concentration level determination unit holding the determination that the concentration level of the driver on driving is dropping, provide the notification to encourage safe driving before the subject vehicle passes by the hazardous object.

6. The driving assistance device according to claim 1, wherein the features of driver's evasive driving include a time to collision (TTC) when the driver initiates braking before the hazardous object.

7. The driving assistance device according to claim 1, wherein the features of driver's evasive driving include a lateral distance between the subject vehicle and the hazardous object when the subject vehicle passes by the hazardous object.

8. A driving assistance method for a vehicle, comprising:

detecting a hazardous object that is capable of causing an accident in a path of a subject vehicle and surroundings of the path, the subject vehicle being the vehicle to which a driving assistance device is applied;

detecting features of driver's evasive driving, in which a driver of the subject vehicle performs driving operations to avoid a danger of the accident when the subject vehicle approaches and passes by the hazardous object detected;

determining a concentration level of the driver on driving based on the features of driver's evasive driving detected;

provide a notification to encourage safe driving when determining that the concentration level of the driver on driving is dropping; and learn the features of driver's evasive driving under normal conditions, wherein the learned features of driver's evasive driving under normal conditions are compared with the detected features of driver's evasive driving to determine that the concentration level of the driver on driving is dropping.

9. A non-transitory computer readable medium having stored thereon instructions executable by a computer to cause the computer to perform a driving assistance method for a vehicle, comprising:

detecting a hazardous object that is capable of causing an accident in a path of a subject vehicle and surroundings of the path, the subject vehicle being the vehicle to which a driving assistance device is applied;

detecting features of driver's evasive driving, in which a driver of the subject vehicle performs driving operations to avoid a danger of the accident when the subject vehicle approaches and passes by the hazardous object detected;

determining a concentration level of the driver on driving based on the features of driver's evasive driving detected; and provide a notification to encourage safe driving when determining that the concentration level of the driver on driving is dropping; and learn the features of driver's evasive driving under normal conditions, wherein the learned features of driver's evasive driving under normal conditions are compared with the detected features of driver's evasive driving to determine that the concentration level of the driver on driving is dropping.

* * * * *